May 11, 1943.  E. QUINN  2,318,632
ASSEMBLING MACHINE
Filed Oct. 6, 1941  7 Sheets-Sheet 1

INVENTOR

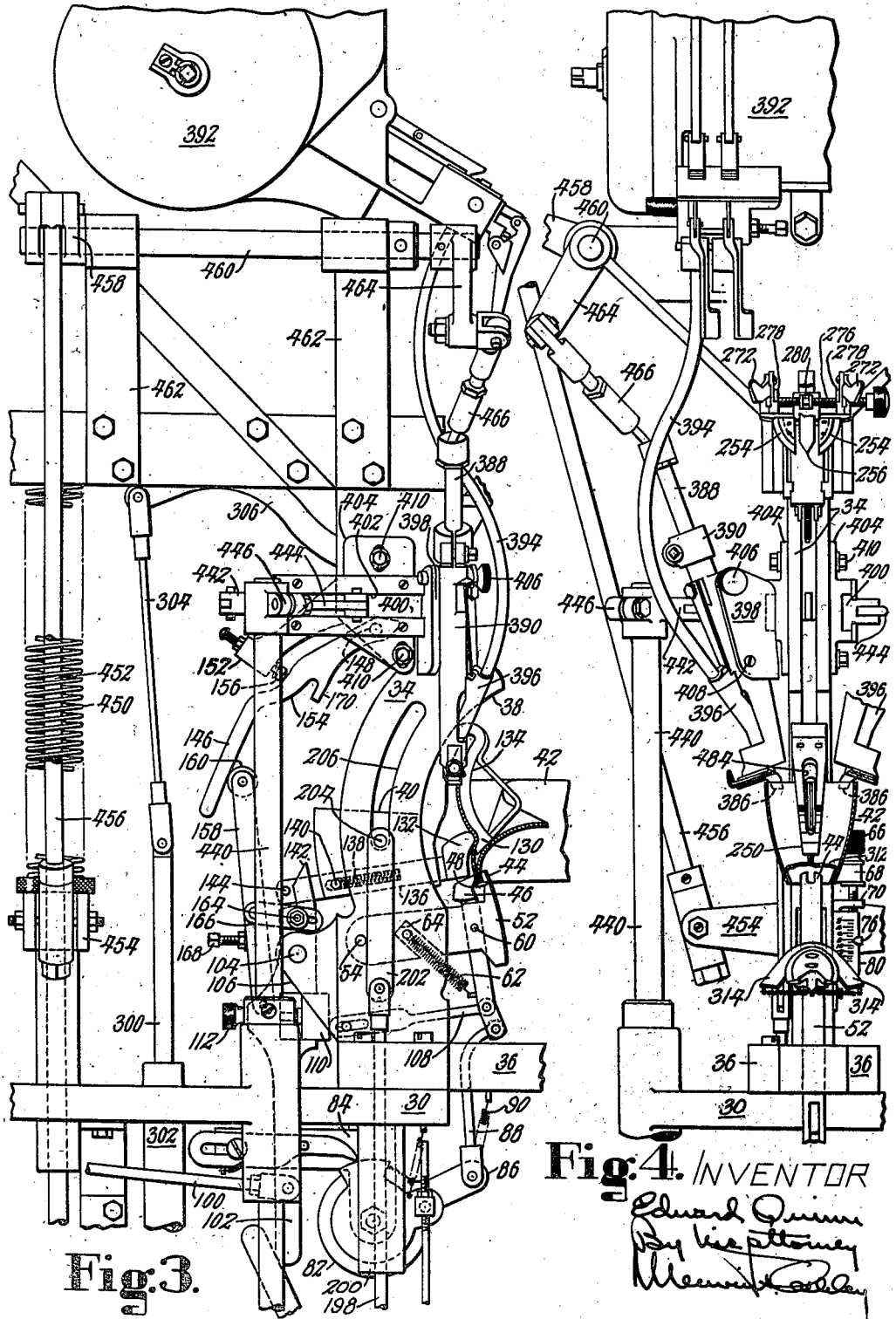

May 11, 1943.  E. QUINN  2,318,632
ASSEMBLING MACHINE
Filed Oct. 6, 1941  7 Sheets-Sheet 4

INVENTOR
Edward Quinn
By his attorney

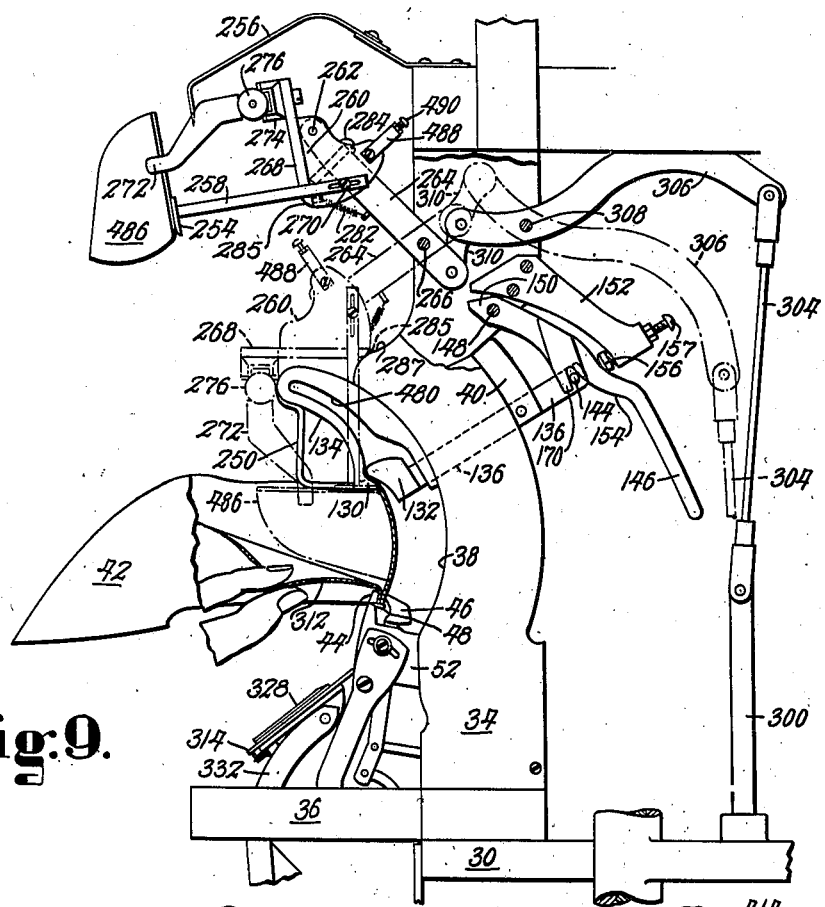

May 11, 1943.       E. QUINN       2,318,632
ASSEMBLING MACHINE
Filed Oct. 6, 1941       7 Sheets-Sheet 6
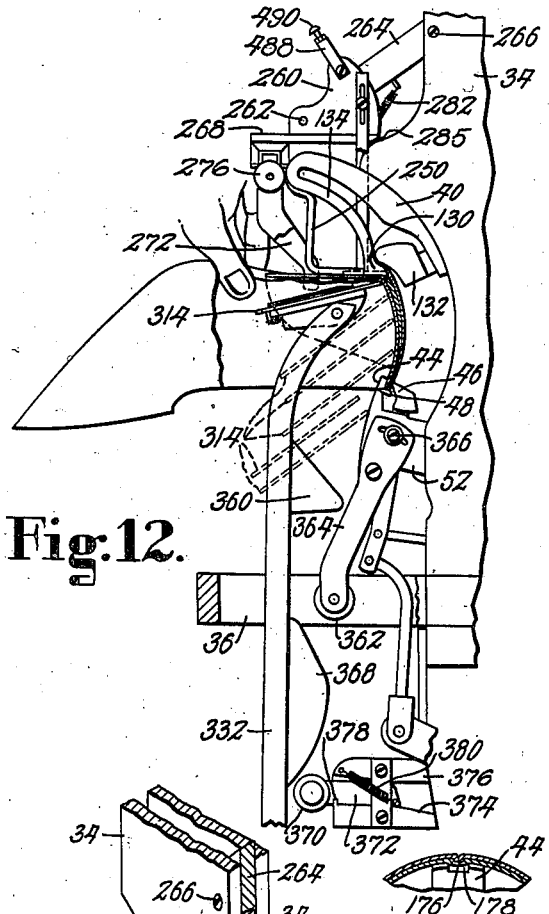
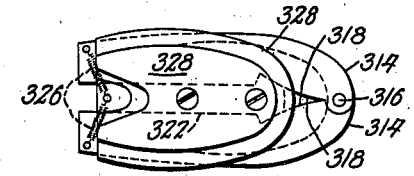
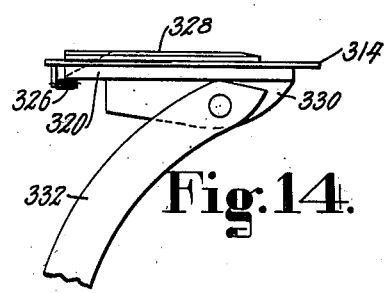
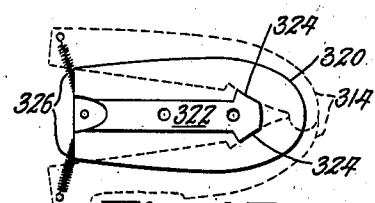
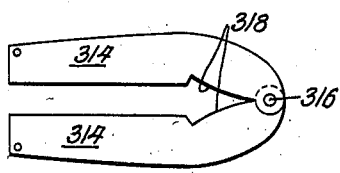
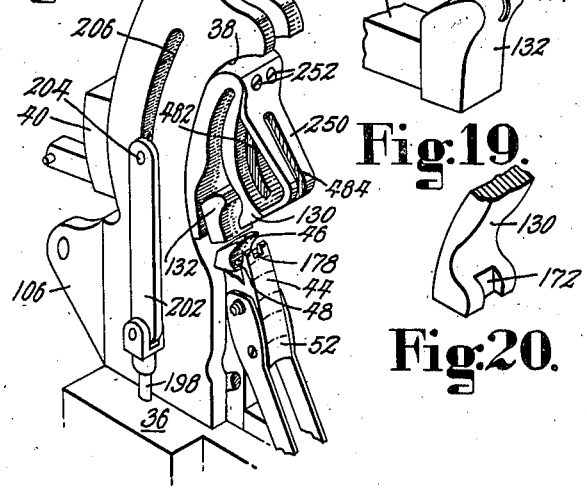
INVENTOR
Edward Quinn
By his attorney

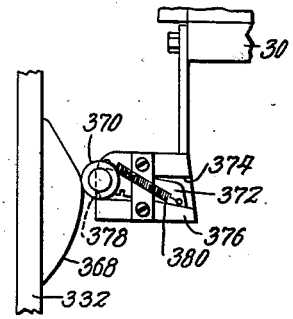
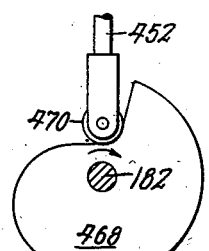
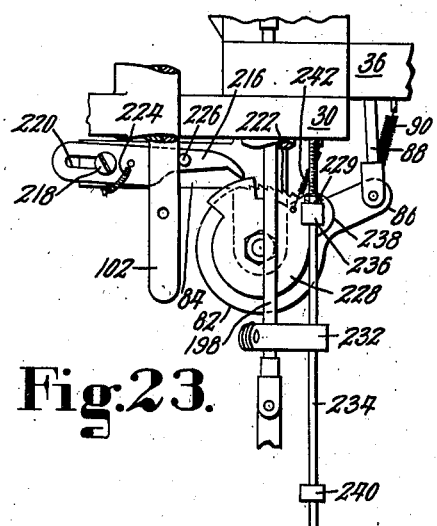
Fig.21.   Fig.25.   Fig.23.
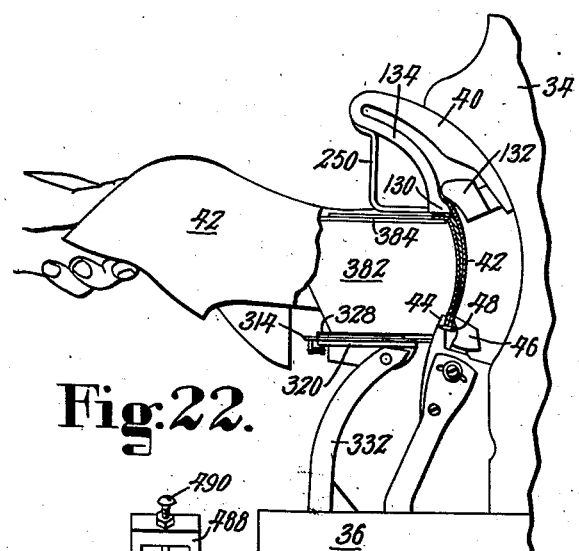
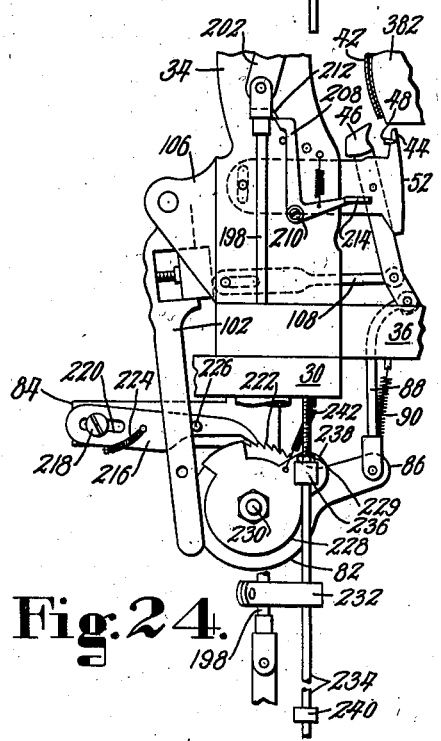
Fig.22.   Fig.24.
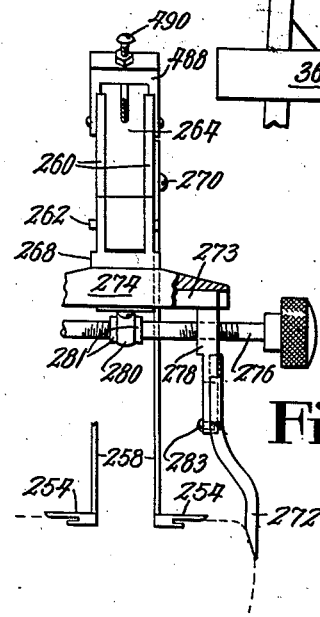
Fig.26.
INVENTOR
Edward Quinn
By his attorney Patented May 11, 1943

2,318,632

UNITED STATES PATENT OFFICE 2,318,632

ASSEMBLING MACHINE

Edward Quinn, Saugus, Mass., assignor to United Shoe Machinery Corporation, Flemington, N. J., a corporation of New Jersey Application October 6, 1941, Serial No. 413,750
In Great Britain May 17, 1941

97 Claims. (Cl. 12—1)

The present invention relates to machines for inserting heel stiffeners or counters into lined uppers. A machine of this type is illustrated in Letters Patent of the United States, No. 2,242,251, granted on May 20, 1941 on an application filed in the name of John T. Lancaster. The term "upper," as hereinafter employed, shall be understood to include back parts or quarters which have not been stitched to their vamps but are assembled with their counters and premolded before the quarters and vamps are stitched together. The upper will be provided with a lining at least at the heel part but in some cases this lining will be no more than a counter pocket.

It is the present practice to assemble uppers and their counters manually preparatory to the preliminary attachment of the upper and the counter to a last and an insole thereon in the usual assembling machine. It is impracticable, if not impossible, to insert a cement treated counter into a lined upper manually and to so locate the parts relatively to each other that they are positioned in predetermined relation to each other widthwise and heightwise thereof.

It is an object of the present invention to provide an improved machine for automatically assembling uppers and counters and arranging them accurately in correct relative position both widthwise and heightwise. It is a further object of the invention to provide in such a machine improved means for wiping the rear part of the lining against the inner surface of the counter in smooth and wrinkle-free condition.

With the above objects in view, the present invention in one aspect thereof consists in the provision in a machine for assembling uppers and counters of means for supporting an upper in a predetermined heightwise position and a counter carrier operable to advance the counter from a loading position through a path confined to a plane common to the longitudinal median line of the supported upper and into a predetermined heightwise relation to the upper. For the convenience of the operator in mounting the counter on the carrier, the carrier in its loading position is so arranged that the counter extends forwardly therefrom. In accordance with an important feature of the invention, the illustrated counter carrier is mounted to swing heightwise of the upper on a member which itself is mounted for such swinging movement. This construction provides a compound motion of the counter from its loading position to its position in the upper, in the construction herein illustrated, such motion being substantially directly downward until the counter enters the upper and then heelwardly to seat the counter against the heel end of the upper. In order to insure a correct orientation of the counter with relation to the supported upper, the counter carrier, in accordance with a further feature of the invention, includes members constructed and arranged to engage the outer surface of the counter wings. In addition to their function of orienting the counter, these members serve to determine the spacing of the counter wings from each other and also to prevent the wings from spreading during the assembling operation. The illustrated wing-engaging members are adjustable toward and from each other to accommodate different sizes of counters. To accommodate counters the wings of which have varying positions heightwise of the counter, provision is made in the illustrated machine for heightwise adjustment of the wing-engaging members.

In positioning the last in the upper, the heel end of the last is located in predetermined heightwise relation to the upper by the engagement of the heel end of the insole on the last bottom with a machine part which, as herein illustrated, engages the insole along its longitudinal median line. It will be understood that the heightwise position of the side margins of the heel end of the insole relatively to its longitudinal median line will vary slightly with differences in convexity of the bottom surface of the heel end of the last. In order that the side portions of the counter flange may be positioned accurately on the insole, the counter carrier, in accordance with a further feature of the invention, is adjustable heightwise of the counter to compensate for such differences in convexity of the heel end of the last bottom.

For supporting an inverted upper, the illustrated machine is provided with means herein illustrated as top margin grippers and bottom margin grippers constructed and arranged to engage the back-seam portion of the upper, said top margin grippers including novel means for supporting an inverted upper by its upper edge. For shaping the heel portion of a shoe upper off the last, the illustrated machine, in accordance with a further featutre of the invention, is provided with wipers constructed and arranged to engage the inner and outer surfaces of the upper respectively and to wipe the upper heightwise toward its lasting margin while the top margin is held by said grippers. Other features of the invention reside in the construction and operation of said wipers, including complementally curved wiping surfaces which cause the wipers to bend the upper heightwise at their point of operation thereon in order to impede the passage of the upper between the wipers, thus creating a tension in the upper during the wiping operation; and including also means on the wiper members for positioning the back-seam portion of the upper widthwise during their wiping operation, said means comprising alternatively a tongue operable within the groove in the back-seam portion of the upper, or means engaging the rib formed by the back-seam substance in the interior of the heel end of the upper. As the wipers near the limit of their wiping movement they are further closed to exert a gripping action on the upper and as they complete their movement they apply a substantial heightwise tension to the upper.

To facilitate the insertion of the counter into the rear part of the upper, the lining at the heel end of the upper is drawn downwardly out of the upper by the operator after the upper has been positioned in the machine and its top margin has been engaged by the grippers. To enable the operator readily to grasp the lasting margin at the rear portion of the lining, the illustrated machine, in accordance with a further feature of the invention, is provided with a lining deflector operable upon introduction of the upper into the machine to separate the rear portion of the lining from the upper and move it toewardly into a position in which the operator may readily grasp it. The illustrated lining deflector is mounted on the inner back-seam wiper and travels heightwise of the upper with the back-seam wiper to provide clearance for the introduction of the counter and the last.

After the counter is inserted into the upper, the rear part of the lining is returned to its position within the upper by means which act to wipe the lining heightwise of the upper toward its lasting margin and to lay it smoothly against the inner surface of the counter, said wiping means as herein illustrated comprising a pair of plates shaped for uniform engagement with the lining and hinged together for expanding and contracting movement during the wiping operation. The illustrated wipers, in accordance with a feature of the invention, are loosely mounted on a carrier on which they are arranged to turn as a unit for orientation relatively to the rear part of the upper. In accordance with a further feature of the invention, the lining wipers are arranged on the wiper carrier at a substantial angle to the longitudinal axis of the upper as they move upwardly to upwipe the lining. This enables the wipers to act first on the extremity of the heel portion of the lining and thereafter on the opposite sides of the heel portion. After the lining wipers have wiped the extremity of the heel portion of the lining to the flange of the counter, the wiper carrier swings about an axis extending widthwise of the upper to complete the upwiping of the opposite sides of the heel portion, bringing the lining wipers into parallel relation to the flange of the counter at the limit of their wiping movement. It has been found that this method of wiping the lining heightwise of the upper may be relied upon to apply the lining smoothly and in wrinkle-free condition to the inner surface of the counter. Other features of the invention relate to the construction and arrangement of the mechanism for operating the lining wipers whereby the wiper carrier is moved toewardly during its downward movement out of the upper to hold the wipers away from the lining and thus to obviate possible dislocation of the lining; and whereby the lining wipers are again moved upwardly after the last has been inserted into the upper thus to force the last into the upper and set it firmly against the flange of the counter. The lining wipers remain at the limit of their upward movement long enough to support the last while the upper is fastened to the insole on the last bottom.

To facilitate the removal of the shoe from the machine, mechanism is provided for opening the grippers which engage the top margin at the back-seam portion of the upper and moving them into a position remote from the upper. In accordance with a further feature of the invention, means is provided for rendering inoperative that portion of said mechanism which moves the grippers into a remote position so that the operator may open the grippers to adjust the upper in the event that it is not accurately centered relatively to the grippers when it is positioned in the machine. As herein illustrated, said grippers are drawn into their remote position by a pawl and ratchet mechanism, and novel, automatic mechanism is provided for disengaging the pawl from the ratchet after the shoe is removed from the machine to permit the return of the grippers to their initial position for the reception of another upper to be operated upon. In the illustrated machine, said automatic mechanism is operated by the return movement of the back-seam wipers to their initial position.

These and other features of the invention will now be described with reference to the accompanying drawings and pointed out in the appended claims.

In the drawings,

Fig. 3 is a side elevation of the head of the machine;

Fig. 4 is a front elevation illustrating parts in the head of the machine;

Fig. 9 is a side elevation illustrating the counter-inserting mechanism;

Fig. 10 is a section on the line X—X of Fig. 2;

Fig. 11 is a section on the line XI—XI of Fig. 2;

Fig. 12 is a side elevation illustrating the lining wipers and their operating mechanism with the wipers at an intermediate stage in their operative movement;

Fig. 13 is a plan view illustrating the lining wipers and the wiper carrier;

Fig. 14 is a side elevation illustrating the lining wipers and the wiper carrier;

Fig. 15 is a plan view similar to Fig. 13 with the top plate of the carrier removed to illustrate underlying parts and the wipers indicated by broken lines;

Fig. 16 is a plan view of the lining wipers without the carrier;

Fig. 17 is a perspective view illustrating the upper grippers and wipers in their rest position and parts of the machine head;

Fig. 18 is an enlarged detail view illustrating one of the grippers in relation to the upper;

Fig. 19 is an enlarged detail view illustrating one form of the upper wiper member which acts on the outer surface of the upper;

Fig. 20 is an enlarged detail view of the upper wiper member which acts on the inner surface of the upper;

Fig. 21 is a detail view illustrating parts of the lining wiper operating mechanism and certain associated parts;

Fig. 22 is a side elevation showing the lining wiper in the operation of forcing a last into a supported upper;

Fig. 23 is a side elevation illustrating mechanism for drawing the upper gripper members downwardly away from the upper;

Fig. 24 is a side elevation, similar to Fig. 23, showing the grippers at the limit of their downward movement;

Fig. 25 is a section on the line XXV—XXV of Fig. 2; and

Fig. 26 is an enlarged detail view, partly in section, illustrating parts of the counter-carrying mechanism.

Figure 1:
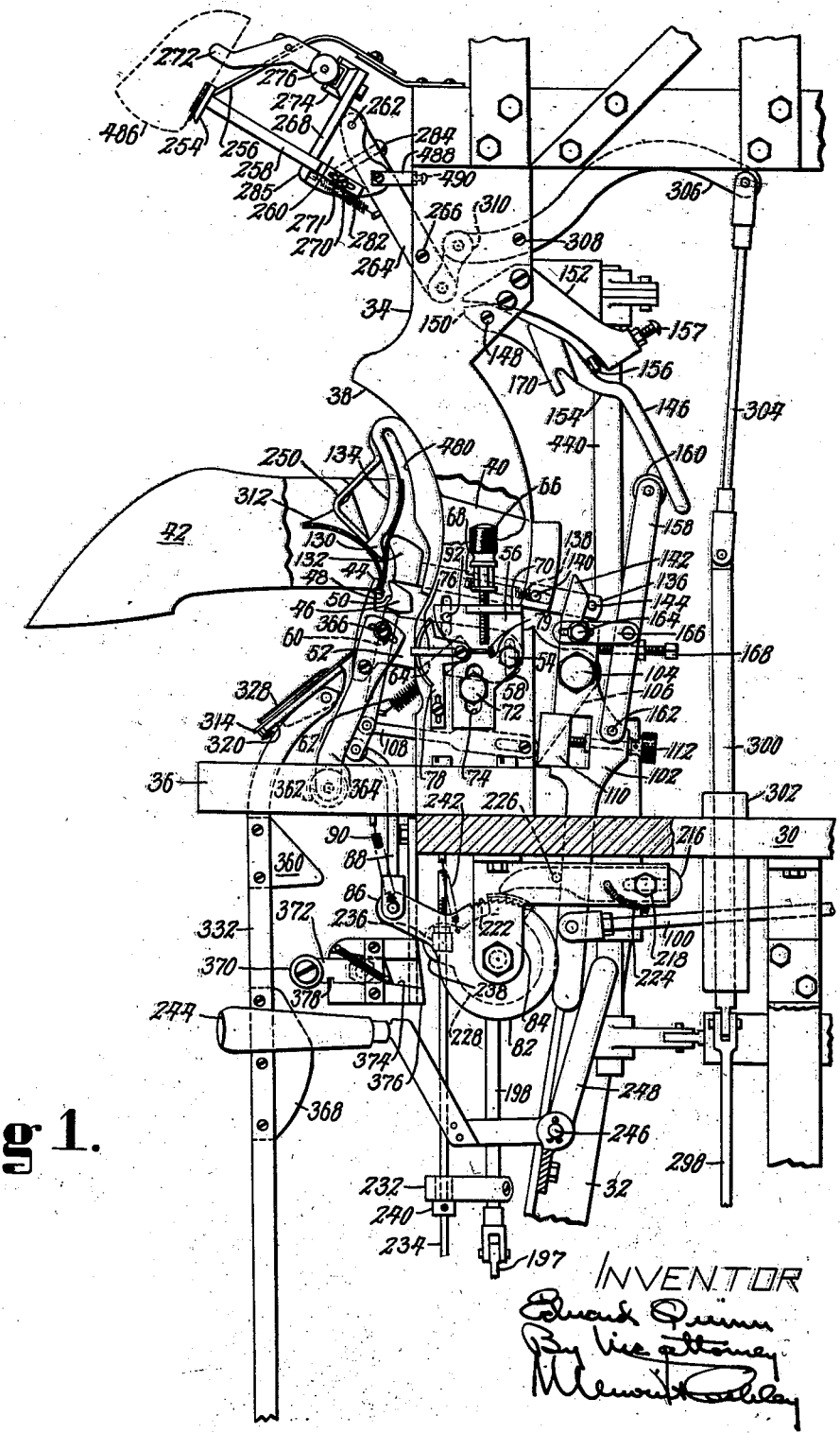
Fig. 1 is a side elevation with parts in section illustrating the head of the machine with the operating parts in their rest position, the extreme upper portion of the machine being broken away.

The illustrated machine is provided with a pair of grippers which engage the top margin of an inverted lined upper in the region of the back seam and locate the upper in a predetermined heightwise position. While the upper is held by the grippers, a pair of wiper members engage the inner and outer surfaces respectively of the back-seam portion of the upper, yieldingly pressing the upper between them, and move upwardly to wipe the upper heightwise toward its lasting margin. During the upward movement of the wipers, the wiper member which acts on the inner surface of the upper engages the inwardly extending rib of the back seam and in the course of its heightwise movement brings said rib into alinement with the path of movement of the wiper thereby straightening the back seam and bringing the rear part of the upper into a predetermined position in the machine. As the wipers near the limit of their upward movement, they are further closed to exert a yielding gripping action on the upper to enable them to tension the back-seam portion of the upper heightwise during the remaining portion of their upward movement.

To position an upper in the machine, the lasting margin at the back-seam portion of the upper is inserted between the back-seam wiper members and moved upwardly between said members bringing the top marginal portion into position to be received between the jaws of the grippers. During such upward movement of the upper, a lining deflector secured to that wiper which engages the inner surface of the upper separates the lining from the upper and moves the lasting margin of the lining toewardly into a position in which the operator may easily take hold of the lining and pull it downwardly out of the upper to permit the insertion of a counter into the rear part of the upper between the upper and the lining. The lining is thus stripped from the upper after the grippers and the wipers have been closed on the upper and just prior to the tripping of a clutch to start the power cycle of the machine.

During the actuation of the back-seam wipers, a counter carrier on which a molded counter was previously positioned moves downwardly to advance the counter from a loading position remote from the upper into a predetermined position in the rear part of the upper, the insertion of the counter into the upper occurring immediately after the completion of the upward movement of the back-seam wipers. During the latter part of its movement, the counter advances generally lengthwise of the upper toward the heel end of the upper and as the counter comes to the limit of its movement of insertion into the upper, it is positioned by the counter carrier in predetermined heightwise relation to the upper. To insure a correct orientation of the counter in the upper, an indicator, or positioning member, secured to a fixed part of the machine serves to orient the counter when the counter is mounted on the carrier by engagement of an end portion of said member with a complementally shaped portion of the counter flange.

It will be understood from the foregoing description that the upper is located by the machine in a predetermined heightwise position and its back-seam portion is located in a predetermined widthwise position. Likewise, the counter is located in a predetermined position of orientation on its carrier and, upon insertion into the upper, is located in a predetermined heightwise position by the carrier. Thus, it will be seen that the counter and upper are accurately assembled in predetermined relation to each other after actuation of the counter carrier.

The counter will, as usual, have been treated with cement before it is mounted on the counter carrier and, upon insertion into the upper, will be pressed firmly into adhering relation to the inner surface of the upper. For bringing the rear part of the lining into adhering relation to the inner surface of the counter, a pair of lining wipers move heightwise of the upper into the interior of its heel portion and spread the lining outwardly and heelwardly into uniform engagement with the inner surface of the counter while the operator maintains a light forward tension on the lining to prevent the occurrence of wrinkles in the lining during the operation of the lining wipers. At the end of their heightwise movement, the lining wipers swing upwardly into alinement with the flange of the counter and flatten the lasting margin of the lining against said flange. Upon completion of the lining wiping operation, the lining wipers are automatically contracted to facilitate their egress from the upper and are then moved toewardly and downwardly out of the upper to permit the manual insertion of a last therein. After the last has been inserted, the lining wipers again move upwardly, this time engaging the cone of the last and moving the last upwardly into engagement with the lasting margin of the lining and heelwardly into firm engagement with the rear part of the lining, the last being positioned lengthwise against the forward jaw of the top seam gripper which is made concave to receive the heel end portion of the last and is sufficiently thin to avoid any considerable displacement of the last from the upper. During the operation of the lining wipers to position the last in the upper, a pair of tackers operate to wipe the lasting margin of the upper at opposite sides of the back seam in over the flange of the counter and, upon completion of the last positioning movement of the lining wipers, the wipers support the last while the tackers tack the lasting margin of the upper together with the flange of the counter and the margin of the lining to an insole on the last bottom. Thereupon the lining wipers move downwardly to their rest position, the top margin grippers and the back-seam wipers open, and the grippers move downwardly into a position remote from the upper whereupon the upper assembled on its last may be readily removed from the machine.

Figure 2:
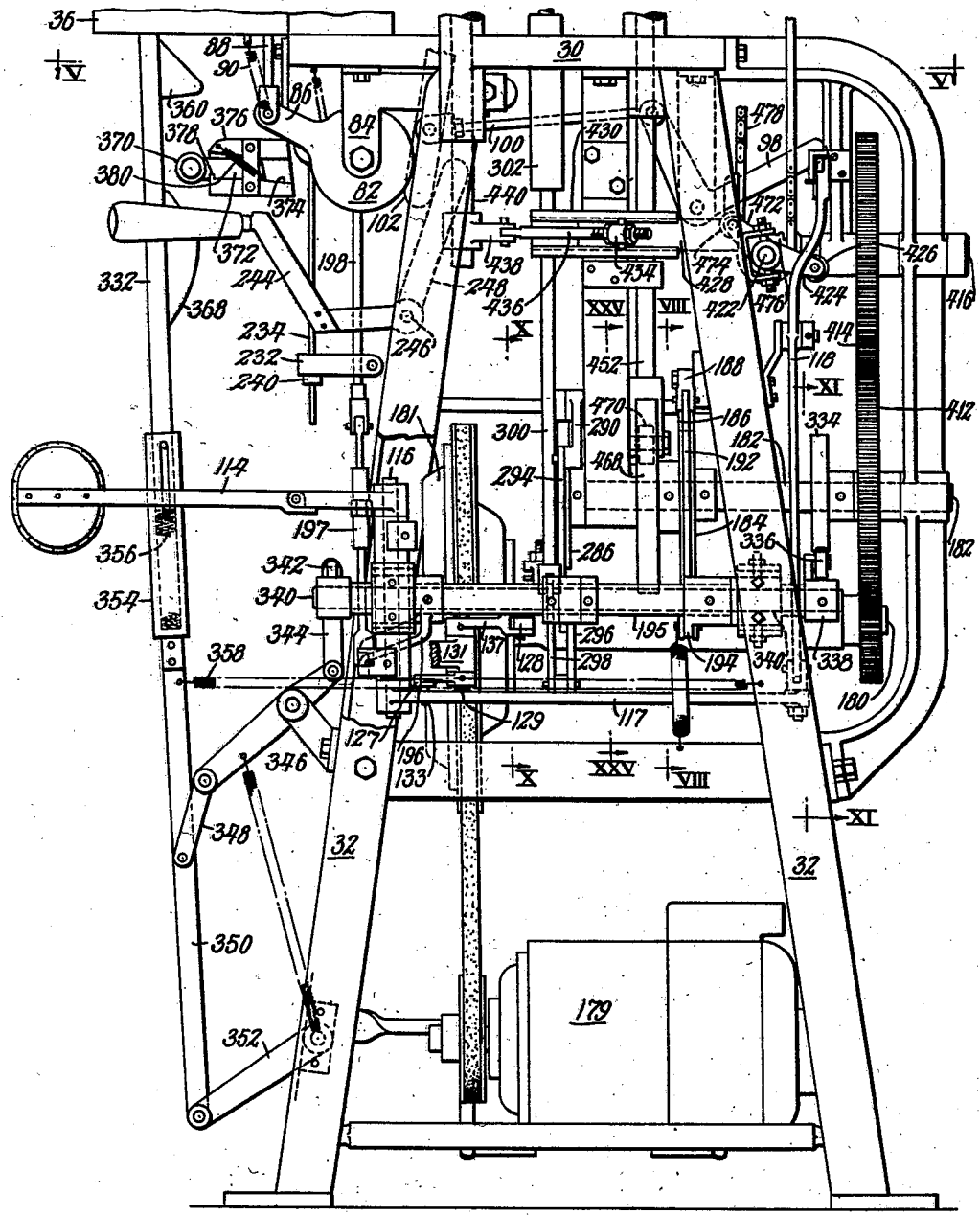
Fig. 2 is a side elevation of the base of the machine.
Figure 5:
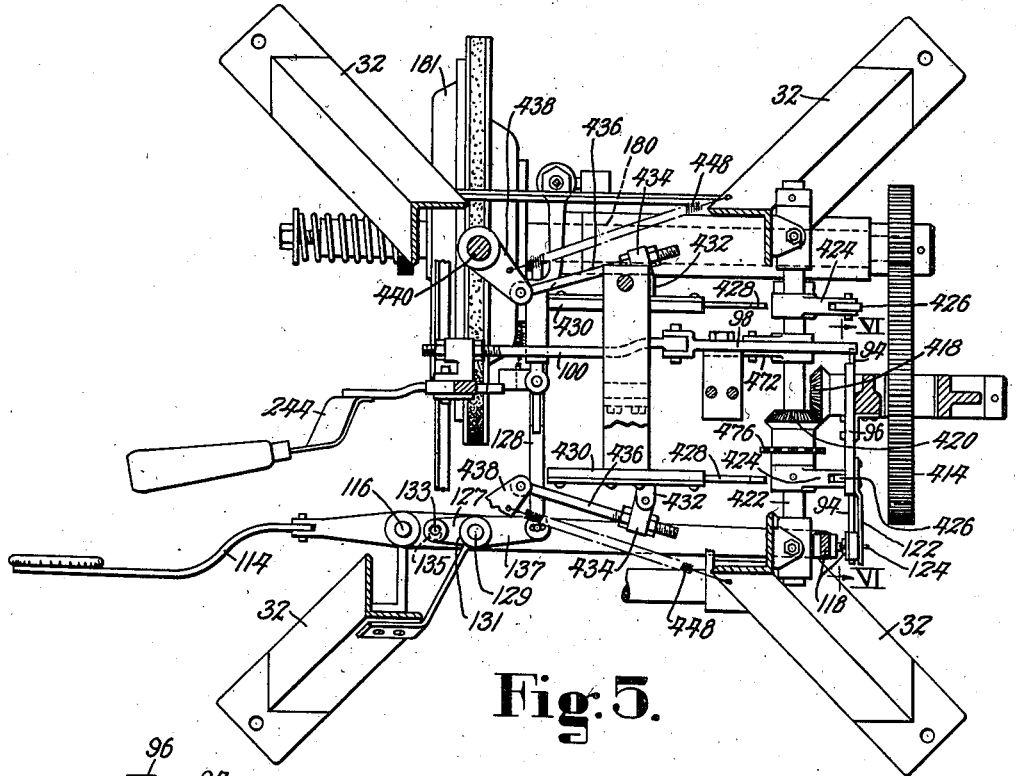
Fig. 5 is a section on the line V—V of Fig. 2.
Figure 7:
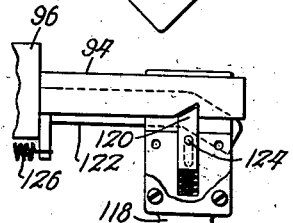
Fig. 7 is an enlarged detail view illustrating part of the gripper opening mechanism.
Figure 6:
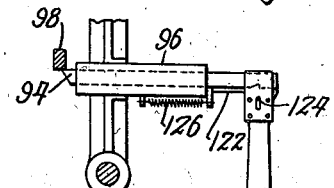
Fig. 6 is a section on the line VI—VI of Fig. 5.

Referring now to Figs. 1 and 2, the illustrated machine comprises a frame which consists of a table 30 mounted on legs 32 and a standard extending upwardly from the table comprising parallel vertical plates 34 (Figs. 1 and 18), the lower portions of said plates being secured to the rear portions of arms 36 fixed to the forward portion of the table 30 and extending forwardly in parallel relation therefrom. The central arcuate portions 38 of the plates 34 serve as rails for a wiper carrier 40. For supporting an inverted lined upper 42, the illustrated machine is provided with a pair of grippers comprising an inner gripper jaw 44 constructed and arranged to engage the top margin of the lining in the region of the back seam and an outer gripper jaw 46 which engages the outer surface of the upper. For locating the upper in a predetermined position heightwise thereof, the inner gripper jaw 44 is provided with a fin 48 arranged at right angles to the gripping surface for engagement with the top edges of the upper and lining, as illustrated in Fig. 1. The outer gripper jaw 46 is provided with a recess 50 to enable the jaws to close without limitation by the fin 48. The inner gripper jaw 44 is an upward extension of the forward portion of an arm 52 positioned between the plates 34. To provide for vertical swinging movement of said arm to adjust the vertical position of the grippers and to swing the grippers downwardly away from the upper after the machine has completed its cycle of operation, said arm is pivotally mounted on a headed screw 54 extending through a bearing in a vertically adjustable plate 56 and thence through a vertical slot 58 in the right-hand plate 34 and into a tapped hole at the rear end of the arm 52. The screw 54 is so located that the gripper jaws 44, 46 move downwardly away from the upper in a curved path tangent to the curve of the back seam of the upper and therefore cannot misplace the upper as they move away from it. The outer gripper jaw 46 is fulcrumed at 60 on the arm 52 and is normally held closed by a spring 62 extending from the lower portion of the gripper arm into a recess 64 in the arm 52. The vertical position of the grippers is determined by the engagement of the arm 52 with a pin 92 mounted in the plate 56 and extending through a slot in the right-hand plate 34 into a position over the arm 52. For adjusting the grippers vertically bodily to accommodate uppers of different heights, the plate 56 is mounted for vertical adjustment on the right-hand plate 34. As herein illustrated, the plate is adjusted by turning a thumb screw 66 journaled in a bracket 68 on the plate 34 and threaded into a tapped hole in a flange 70 extending outwardly from the plate 56. The plate is secured in adjusted position by a clamping screw 72 extending through a vertical slot 74 and threaded into the plate 34. For indicating the adjustment of the grippers in terms of shoe sizes, an indicator or finger 76 is pivoted on a plate 78 secured to the plate 34, said finger having a rearward extension which is engaged by pins 79 on the plate 56. Referring to Fig. 4, the plate 78 has an arcuate flange 80 on which a scale of shoe sizes is inscribed. To provide for variations in heel heights occasioned by differences in shoe styles, the plate 78 has a screw-and-slot connection to the plate 56, as shown in Fig. 1. For swinging the arm 52 vertically to move the grippers to and from their operative position a disk 82 is fulcrumed on a bracket 84, said disk having an arm 86 which is connected by a link 88 to the lower end of the outer gripper jaw 46. A spring 90 extending from the table 30 to the arm 86 yieldingly holds the arm 86 at the limit of its upward movement and maintains the gripper jaws in their operative position, said position being determined by the engagement of the arm 52 with the pin 92 as above described. When the machine is at rest, the grippers 44, 46 are held in their open position illustrated in Fig. 1 by a latch member 94 (Fig. 6) slidably mounted in a fixed bearing 96 and arranged to engage the horizontal arm of a bell crank lever 98 (Fig. 2) the vertical arm of which is connected by a link 100 to the lower portion of a lever 102 (Fig. 1) fulcrumed at 104 on a rearward extension 106 of the left-hand plate 34 and arranged to act against the rear end of a rod 108 positioned between the plates 34 and connected to the lower portion of the outer gripper jaw 46 and having at its rear end a pin-and-slot connection to the left-hand plate 34. For adjusting the space between the gripper jaws 44, 46 in their open position in accordance with the thickness of the rear parts of uppers to be operated upon, the lever 102 carries a block 110 arranged to engage the rear end of the rod 108 and adjustable in the direction of the length of said rod by turning a thumb screw 112. After positioning an upper between the gripper jaws, as illustrated in Fig. 1, the latch 94 is disengaged from the bell crank lever 98 to permit the spring 62 to close the gripper jaws, the retraction of the latch being effected by the operation of a knee lever 114 (Figs. 2 and 5) secured to the upper end of a vertical shaft 116 journaled in a fixed bearing and having secured to its lower portion a lever 117 which extends rearwardly to the back of the machine and is connected to a lever 118 which carries at its upper end a latch 120 (Fig. 7) which acts on the latch member 94. In order to insure the return of the latch member 94 to latching position before the bell crank lever 98 returns to its position, illustrated in Fig. 2, a fixed cam plate 122 (Fig. 7) is constructed and arranged to act on a pin 124 extending outwardly from the latch 120 through a slot in the head of the lever 118. The operation of the knee lever 114 swings the lever 118 in a clockwise direction, as seen in Figs. 6 and 7, first disengaging the latch member 94 from the bell crank lever 98 and thereafter bringing the pin 124 into engagement with the cam plate 122 and disengaging the latch 120 from the latch member 94 whereupon said member is returned to latching position by a spring 126. Further actuation of the knee lever 114 after retracting the latch member 94 operates a short lever 127 (Fig. 5) secured to the lower portion of a short vertical shaft 129 (Fig. 2) journaled in a fixed bearing 131, said lever having at its front end a pin 133 extending downwardly from said lever into a slot 135 (Fig. 5) in the lever 117 said slot affording a sufficient lost motion of the lever 117 relatively to said pin to enable said lever 117 to retract the latch member 94 before it acts on the lever 127. The actuation of the lever 127 turns the short shaft 129 in a clockwise direction, as seen in Fig. 5, thus operating a lever 137 secured to the upper portion of said shaft, said lever having a pin-and-slot connection to a sliding bar 128 which operates a one-revolution clutch mechanism to initiate the power cycle of the machine.

For wiping the back-seam portion of the upper 42 heightwise toward its lasting margin, the illustrated machine is provided with an inner wiper member 130 (Fig. 1) constructed and arranged to engage the inner surface of the back-seam portion of the upper and an outer wiper member 132 constructed and arranged to engage the outer or grain surface of the upper. The inner wiper 130 is formed in the end portion of an arm 134 which extends upwardly from the wiper and is curved to conform generally to the heightwise curvature of the back-seam portion of the upper. It will be seen that the arm 134 is an extension of the carrier 40, the forward surface of the carrier and the rear surface of the arm defining a narrow space into which the operator inserts the back-seam portion of the upper to position the upper in the machine. The outer wiper 132 is formed in the head of a slide 136 which is mounted in the carrier 40 for longitudinal movement toward and from the inner wiper 130. The outer wiper is yieldingly urged against the upper 42 by a spring 138 mounted in a groove in said slide and arranged to act against a pin 140 in the carrier. The spring 138 is much lighter than the spring 62 which acts on the gripper 46, its only function being to maintain wiping engagement of the outer wiper 132 with the upper during the upward movement of the wipers. When the machine is at rest, the wipers 130, 132 are held open, as seen in Fig. 1, by upward extensions 142 of the lever 102 which engage a cross pin 144 at the rear end of the slide 136. In order to tension the upper heightwise, wipers 130 and 132 are caused to grip the upper just before they come to the limit of their upward movement and during the remaining portion of their upward movement, the back-seam portion of the upper is tensioned between the wipers 130 and 132 and the grippers 44, 46. The wipers are caused to grip the upper by a further forward movement of the slide 136 produced by the engagement of the pin 144 at the rear end of the slide with a lever 146 (Figs. 1 and 9) pivoted at 148 between the plates 34 and held against forward swinging movement by the engagement of a forward extension 150 with the forward portion of an arm 152 secured between the plates 34. The lever 146 is slotted longitudinally to receive the end portion of the slide 136 and to permit the pin 144 to engage a cam surface 154 on said lever (Fig. 9). As said pin moves upwardly along said cam surface, the lever 146 yields rearwardly against a spring-pressed pin 156 mounted in the lower end portion of the arm 152, the pressure of said pin against the lever being adjustable by turning a stop screw 157 to vary the gripping pressure of the outer wiper member 132 against the upper. The pressure of the member 132 against the upper will also vary as the thickness of the upper materials varies, the pressure being greater on thicker materials than on relatively thin materials. This will insure a relatively heavy tension on the thicker upper materials which, of course, offer greater resistance to the heightwise tensioning operation than do the thinner upper materials. Upon the completion of the operations of the machine upon the upper, the grippers 44, 46 are opened and the wipers 130 and 132 are moved away from each other by the lever 102 to permit the removal of the upper from the machine. At this time, the wipers are in their upper position illustrated in Fig. 9. In order that the lever 102 may act to separate the wipers from each other while they are held in their upper position, said lever carries an upwardly extending arm 158 (Fig. 1) having at its upper end a roll 160 which engages a downward extension of the lever 146. The upper portion of the arm 158 is adjustable to position the roll 160 in proper relation to the lever 146 by swinging said arm about its pivotal connection 162 with the lever 102, the arm being secured in adjusted position by a clamping screw 164 extending through a slot in a link 166 pivoted to the arm 158, said screw being threaded into a tapped hole in the lever 102. A screw 168 on the arm 158 takes the thrust of the lever 146 against the said arm. The lever 146 has fingers 170 which engage the pin 144 in the slide 136, as shown in Fig. 9, to move said slide rearwardly thereby to move the outer wiper 132 away from the inner wiper 130 to leave the upper free to be removed from the machine.

In order that the inner wiper 130 may operate to bring the back-seam portion of the upper into alinement with the path of movement of the wipers, said inner wiper is provided with a notch 172 (Fig. 20) constructed and arranged to receive the rib formed by the inturned edges of the upper at the back seam. During the upward movement of the inner wiper member, the side walls of said notch engage said rib and bring it into alinement with the path of movement of the wiper. This action of the wipers brings the back-seam portion of the upper into a predetermined central position in the machine and it also serves to straighten the back seam of the upper if it is distorted when the upper is inserted into the machine. In an alternative construction illustrated in Fig. 19, the back-seam portion of the upper is centered and straightened by engagement of a tongue 174 on the outer wiper 132 within the groove in the outer surface of the back-seam portion of the upper. If desired, both the notched inner wiper and the tongued outer wiper may be employed. In positioning the upper in the machine, the upper is centered with relation to the forward or inner gripper jaw 44 by causing the slightly offset portion 176 (Fig. 18) of the lining at the back-seam portion of the upper to be positioned within a notch 178 in said inner gripper jaw. In order to impede the passage of the upper between the wipers during their up-wiping operation, thereby to create a light tension in the back-seam portion of the upper, the upper-engaging surfaces of the wipers are complementally curved heightwise of the upper to enable them to create a slight bend in the upper at their point of operation thereon (Fig. 1).

Figure 8:
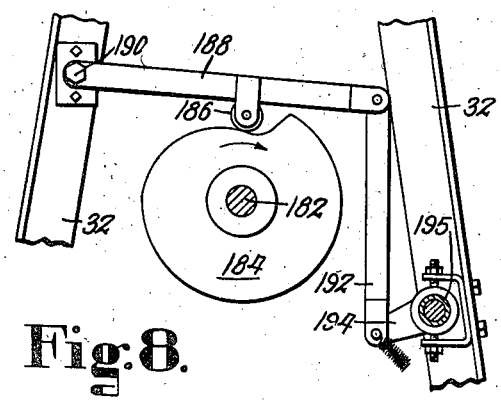
Fig. 8 is a section on the line VIII—VIII of Fig. 2.

For actuating the wipers and other automatic mechanism hereinafter described, a motor 179 (Fig. 2) is operatively connected to rotor 181 (Figs. 2 and 5) loosely mounted on a shaft 180, a one-revolution clutch mechanism, which may be of any suitable construction, being provided to connect said rotor to said shaft. The shaft 180 is connected to a camshaft 182 by gears of a ratio such that the camshaft is turned 180° for every complete revolution of the shaft 180. This organization of the operating mechanism divides the power cycle of the machine into two equal parts, for reasons hereinafter explained. For actuating the wipers, a cam 184 (Fig. 8) is secured to the camshaft 182 and arranged to act against a roll 186 on a lever 188 mounted to swing on a fixed fulcrum 190. The lever 188 is connected by a link 192 to an arm 194 secured to a rocking sleeve 195 extending from front to rear of the machine. At its forward end the sleeve has fixed thereto an arm 196 (Fig. 2) which is connected by an extensible link 197 to a vertical shaft 198 mounted for sliding movement in a fixed bearing 200 (Fig. 3). The upper end of the shaft 198 is connected by a link 202 to a pin 204 mounted in the wiper carrier 40 and extending laterally therefrom through an arcuate slot 206 in the left-hand plate 34. During the second phase of the power cycle of the machine, the wipers are held at the upper extremity of their path of movement, illustrated in Fig. 22, by a latch 208 (Fig. 24) pivoted at 210 on the left-hand plate 34 and arranged to engage a striker member 212 on the shaft 198. After the upper and its last are removed from the machine, the operator withdraws the latch from the striker member 212 by downward movement of a finger lever 214 extending forwardly from the lower portion of the latch arm, thus permitting the return of the wipers to their initial position illustrated in Fig. 1.

To facilitate the removal of the upper and its last from the machine upon completion of the operations on the upper, the grippers 44, 46 are first opened and then moved downwardly from their position in Fig. 1 to their position in Fig. 24 in which they are out of contact with the upper. Both the opening of the grippers and their downward movement are effected by the operation of the lever 102, the grippers being opened by the forward movement of the rod 108 by the lever 102 and moved downwardly by mechanism now to be described. Referring now to Figs. 23 and 24, a pawl 216 is connected to a rearward extension of the bracket 84 by a headed screw 218 extending through a longitudinal slot 220 in the pawl, said pawl being arranged to engage ratchet teeth 222 in the disk 82. The pawl is urged downwardly and rearwardly by a spring 224 extending from a pin on the pawl to a pin on the bracket. The lever 102 lies adjacent to the pawl and as it moves in a counterclockwise direction, as seen in Figs. 23 and 24, to open the gripper jaws, it engages a pin 226 on the pawl and moves the pawl forwardly into engagement with one of the ratchet teeth 222 thereby swinging the arm 86 downwardly and drawing the grippers downwardly into their position illustrated in Fig. 24. After the upper and its last are removed from the machine, the gripper jaws are returned to their initial position, illustrated in Fig. 1, by the spring 90 upon release of the pawl by the operation of a discoidal member 228 having an inturned flange which overlies the upper edge face of the disk 82. Simultaneously with the downward movement of the wipers to their initial position, illustrated in Fig. 1, the member 228 is swung in a clockwise direction, as seen in Fig. 24, about its center 230 to cause its inturned flange to lift the pawl from the ratchet teeth thus permitting the return of the grippers to their initial position by the spring 90. Said inturned flange also serves as a shield to hold the pawl away from the ratchet teeth until the latter part of the machine cycle, thus enabling the operator to open the grippers 44, 46 by means of a hand lever 244 (Fig. 1), as hereinafter described, without also moving the grippers downwardly. For actuating the member 228, the shaft 198 which operates the wipers has clamped thereto an arm 232 having an opening through which extends a rod 234 supported at its upper end on a block 236 swiveled on an ear 238 on the member 228. During the downward movement of the shaft 198, the arm 232 engages a collar 240 on the rod 234 moving the rod downwardly and swinging the member 228 into its position, illustrated in Fig. 1. During the upward movement of the shaft 198 to actuate the wipers, the arm 232 moves away from the collar 240 and a spring 242 turns the member 228 in a clockwise direction, as seen in Fig. 1, to expose the ratchet teeth 222 to the action of the pawl 216. The clockwise movement of the member 228 is arrested by the engagement of the rod 234 with the bottom of the table 30. The position in which the member 228 comes to rest is determined by the adjustment of a nut 229 on the rod 234 which determines the position of the block 236 on the rod. It will be seen from Fig. 23 that the rest position of the member 228 determines the extent of movement of the pawl 216 on the inturned flange of said member preceding the engagement of the pawl with the ratchet teeth 222. Inasmuch as the pawl is actuated by the lever 102 which opens the gripper jaws 44, 46, the adjustment of the member 228 provides a determinate time interval between the opening of the grippers and their downward movement into their position illustrated in Fig. 24 and insures the release of the grippers from the upper before their downward movement commences.

To enable the operator to open the gripper jaws 44, 46 before initiating the power cycle of the machine in the event that the upper requires adjustment to center the back seam with relation to the grippers, the illustrated machine is provided with a hand lever 244 (Fig. 1) mounted on a fixed fulcrum 246 and having an upwardly extending arm 248 constructed and arranged to engage the lower end of the lever 102 and swing said lever in a clockwise direction, as seen in Fig. 1, to open the gripper jaws. It will be understood that the operation of the hand lever will also return the bell crank lever 98 (Fig. 2) to its latched position leaving the operator free to use both hands to center the back-seam portion of the upper with relation to the grippers. During the operation of the hand lever 244, the inwardly extending flange of the member 228 serves as a guard to prevent the pawl 216 from engaging the ratchet teeth 222 and moving the grippers downwardly from their initial position.

For moving the back-seam portion of the lining forwardly to the position illustrated in Fig. 1 to enable the operator to grasp it and draw the rear part of the lining downwardly out of the upper to permit the insertion of a counter into the upper, a lining deflector, herein illustrated as an L-shaped plate 250 (Fig. 1), is secured to the arm 134 and its lower portion is arranged to form a lining deflecting surface continuous with the flat bottom surface of the inner wiper 139. This lining deflecting surface acts during the upward movement of the upper into its position in the machine, illustrated in Fig. 1, to separate the lining from the back-seam portion of the upper and displace it toewardly, as illustrated in Fig. 1. In inserting a counter into an upper which has no lining other than a counter pocket, the counter must be advanced substantially heightwise of the upper into the heel portion of the upper in order to avoid contact with the seam securing the counter pocket to the upper. Inasmuch as the lining deflector 250 would obstruct such movement of the counter, the lining deflector is removably attached to the arm 134 by two screws 252 (Fig. 17) conveniently accessible to the operator.

For inserting a molded counter into the upper, the illustrated machine is provided with a counter carrier comprising a pair of counter holders 254 (Figs. 1, 4 and 26) constructed and arranged to engage the curved portion of the counter flange and separated from each other, as illustrated in Fig. 4, to provide clearance for a counter locating member 256 secured to a fixed part of the machine and so arranged that when the counter carrier is positioned at the counter loading station, illustrated in Fig. 1, the V-shaped end portion of said member is positioned between the counter holders 254 for engagement within a complementally shaped notch formed in the center of the counter flange. It will be understood that in positioning a counter on the counter holders 254 the counter will be centered with relation to the holders by the locating member 256 without any effort on the part of the operator or loss of time in the assembling operation. Each of the counter holders 254 is grooved to receive the curved portion of the counter flange, the dimension of said groove heightwise of the counter being such that upon insertion of the flange into said grooves, the counter will be frictionally held in the position determined by the counter locating member 256 during the movement of the counter carrier to position the counter in the upper. The counter holders 254 are secured to the outer ends of parallel arms 258 mounted at opposite sides of a member 260 fulcrumed at 262 on a lever 264 positioned between the upper portions of the plates 34 to swing on a fixed fulcrum 266. The member 260 comprises parallel arms (Fig. 26) terminating in a crosshead 268. Each of the arms 258 is positioned in a notch provided in the crosshead 268 and is secured to the member 260 by a screw 270 extending through a longitudinal slot 271 (Fig. 1) in the arm, thus affording longitudinal adjustment of the arm to vary the heightwise position of the counter as may be required. The spread of the counter wings is determined by a pair of wing-engaging members 272 each of which is mounted on an arm 278 (Fig. 26) carried by a slide 273 positioned in a guideway provided by a channel member 274 secured to the crosshead 268. The arms 278 are adjustable toward and from each other to accommodate different widths of counters by turning a right and left threaded screw 276 which is threaded into said arms and is held against longitudinal movement by a bearing member 280 surrounding the central portion of said screw and engaging flanges 281 on said screw, said bearing member 280 being secured to the channel member 274. The wing-engaging members 272 are adjustable longitudinally of the arms 278 to accommodate counters of different shapes and are secured in adjusted position by clamping screws 283. In the course of the movement of the counter carrier from its position in Fig. 1 to its position illustrated in broken lines in Fig. 9, the lever 264 swings downwardly into a predetermined fixed position. As the lever 264 begins its downward movement, the member 260 which carries the counter supporting parts is swung in a counterclockwise direction, as seen in Fig. 9, by a spring 282 into its full line position in Fig. 9, this position being determined by engagement of the crosshead 268 with the end of a stop screw 284 in the lever 264. As the counter moves into the upper, it engages the then vertical portion of the lining deflector 250 causing a reverse movement of the counter carrier about its pivotal connection 262 with the lever 264. As the counter advances toward the heel end of the upper, the arm 134 which carries the inner wiper member, approaching the limit of its upward movement, engages the member 268, and again swings the counter carrier in a counterclockwise direction, positively advancing the counter toward the heel end of the upper. As the lever 264 nears the limit of its downward movement, the convexly beveled rear edge face 285 of the crosshead 268 engages the forwardly curved edge portions 287 of the plates 34 which exert a cam action on the counter carrier, continuing its counterclockwise movement and bringing the counter finally into predetermined relation to the upper lengthwise thereof and seating the counter firmly against the inner surface of the back-seam portion of the upper which, at that time, is securely held under heightwise tension between the grippers 44, 46 and the wiper members 130 and 132. If the lining deflector is removed from the machine, the downward movement of the counter into the upper will be guided by engagement of the counter with the arm 134. As the counter carrier swings downwardly to position the counter and the upper, the counter holders 254 will be positioned at opposite sides of the lining deflector, the lower portion of which is slightly narrower than the space between said counter holders. After the counter carrier has come to the limit of its counter inserting movement, the lever 264 is located in a predetermined invariable position, as indicated by broken lines in Fig. 9, and the arms 258 which carry the counter holders are substantially vertical, the position of the counter heightwise of the upper being determined by the adjustment of the arms 258 on the member 260.

For actuating the counter carrier, a cam 286 (Fig. 10) mounted on the shaft 182 is constructed and arranged to act on a roll 288 on a lever 290 against the tension of a spring 291, said lever being mounted to swing on a fixed fulcrum 292 and connected by a link 294 to a lever 296 which, in turn, is connected by a link 298 to a shaft 300 mounted for sliding movement in a bearing 302. Pivoted to the upper end of the shaft 300 is a link 304 (Fig. 1) which is pivoted at its upper end to a lever 306 which extends forwardly between the plates 34 and is fulcrumed at 308 thereon and connected by a link 310 to the rear end of the lever 264.

Having thus positioned the upper and the counter in predetermined heightwise relation to each other, the rear portion 312 of the lining is wiped upwardly against the inner surface of the counter by a pair of lining wipers (Figs. 12 to 16, inclusive), while the counter wing-engaging members 272 hold the wing portions of the counter against spreading under the widthwise pressure of the wipers. Because of the relatively narrow opening in the top of the counter at its heel end, the lining wipers must enter the upper at a location spaced toewardly from the heel end of the upper. Accordingly, the lining wipers move upwardly from their position in Fig. 1, along the concave forward surface of the arm 52 until they come to a position just below the upper and then they move upwardly and toewardly in a path indicated by the broken-line showings of the lining wipers in Fig. 12 until the lining wipers have entered the upper whereupon they move heelwardly to bring the lining into contact with the counter and then they move upwardly to wipe the lining heightwise against the end and side portions of the counter. The illustrated lining wipers comprise a pair of plates 314 (Fig. 16) hinged together at 316 and having inner convexly curved edge faces 318 extending convergently toward the hinge. The lining wipers are mounted on a wiper carrier 320 (Fig. 15) having a raised central portion 322 provided with concavely curved edge faces 324 complemental to the edge faces 318 of the wipers, the wipers being held against said edge faces, as illustrated in Fig. 15, by springs 326. The wipers are held in place on the wiper carrier 320 by a top plate 328 (Figs. 13 and 14) secured to the raised central portion 322 of the wiper carrier. The wiper carrier has a downwardly extending longitudinal flange 330 (Fig. 14) which is pivotally mounted between the curved upper end portions of parallel vertical arms 332. For actuating the lining wipers, a cam 334 (Fig. 11) is secured to the camshaft 182 and arranged to act against a roll 336 on an arm 338 secured to a horizontal shaft 340 extending from front to back at the right side of the machine. At its forward end, the shaft 340 has secured thereto an arm 342 (Fig. 2) which is connected by a link 344 to a lever 346 which, in turn, is connected by a link 348 to a bar 350 pivoted at its lower end to a vertically swinging arm 352. At its upper end, the bar 350 carries a hollow member 354 in which are mounted the lower ends of the parallel vertical arms 332 and a spring 356 through which the bar 350 acts on the arms 332. The lining wipers are yieldingly urged heelwardly of the upper by springs 358 extending from the bar 350 to the legs 32. For moving the lining wipers toewardly to permit them to enter the upper, the parallel arms 332 carry a cam member 360 constructed and arranged to engage a roll 362 (Fig. 12) as the arms move upwardly, said roll being mounted at the lower end of an arm 364 pivoted on the gripper carrier 52 and held in adjusted position by a clamping screw 366. It will be understood that when the carrier 52 is vertically adjusted to position the grippers 44, 46 in accordance with the heightwise dimension of the back-seam portion of the upper, the roll 362 will move with it so as to insure the beginning of the upwipe of the lining wipers at the desired point on the upper. During the downward movement of the parallel arms 332, to retract the lining wipers, the wipers are immediately disengaged from the lining by movement of said arms toewardly of the upper by the action of a cam plate 368 secured between the arms 332 and arranged to engage a roll 370 at the forward end of a slide 372 mounted in a slideway 374 in a fixed plate 376. During the downward movement of the wipers, said slide 372 is held in its position, illustrated in Fig. 12, by a tooth 378 extending upwardly from the plate 374 into a notch in said slide. The walls of the slideway diverge in opposite directions from the central portion of the slideway to permit a limited upward swinging movement of the slide 372 to disengage it from the tooth 378. During the upward movement of the wipers, the cam plate 368 is inoperative because the upward movement of said cam plate moves the roll 370 upwardly disengaging the slide 372 from the tooth 378 and moving the slide rearwardly in the slideway 374. After the cam plate 368 has passed upwardly beyond the roll 370, a spring 380 returns the slide 372 to its forward position, illustrated in Fig. 12. When the lining wipers 314 enter the upper, they are held in their contracted position, illustrated in Fig. 16, by the springs 326. Upon movement of the lining wipers heelwardly of the upper into engagement with the back-seam portion of the lining, the wiper carrier moves heelwardly relatively to the wipers causing the curved edge faces 324 of the raised portion of the wiper carrier to exert a wedging action against the wiper plates spreading them outwardly into engagement with opposite side portions of the lining. At the same time, the wiper plates are swung as a unit by their contact with the side portions of the lining, thus orienting them relatively to the inner surface of the counter. As the wipers move upwardly, they follow the inner contour of the counter first expanding, and then contracting as they follow the heightwise curvature of the side portions of the counter. The hinged portions of the wiper plates engage the lasting margin of the lining as they come into their full line position illustrated in Fig. 12, and as the wiper carrier continues its upward movement from this point it swings about its fulcrum on the arms 332, thus bringing the lining wipers into parallel relation to the flange of the counter and pressing the lasting margin of the lining firmly against said flange. During the upward movement of the wipers, the operator will maintain a light forward tension on the lining to prevent the occurrence of wrinkles therein during the lining wiping operation. After the retraction of the lining wipers from the upper, the machine stops to permit the insertion of a last into the upper.

Referring to Fig. 22, a last 382 is manually inserted into the upper during the interval between the two parts of the power cycle of the machine and, while the operator holds the last in position in the upper, he again operates the knee levers 114 to start the second half of the power cycle. Thereupon the lining wiper assembly again moves upwardly bringing the top plate 328 of the wiper carrier into engagement with the cone of the last and forcing the last upwardly into the upper. During such upward movement of the last, the springs 358 (Fig. 2) which act on the lining wipers urge the last heelwardly against the back-seam portion of the upper by reason of the frictional engagement of the top plate 328 of the lining wiper assembly with the cone of the last. The heel end of the cone portion of the last will thus be brought into engagement with the front face of the inner gripper jaw 44 but this will not prevent the last from being brought firmly into contact with the back-seam portion of the upper since the forward face of said gripper has a shape complemental to the contour of that portion of the last which engages it and is sufficiently thin to obviate any considerable displacement of that portion of the last from the upper. Having forced the last into the upper, the lining wiper assembly remains in its position illustrated in Fig. 22 to support the last while the lasting margin of the upper together with the flange of the counter and the lasting margin of the lining are tacked to an insole 384 on the last bottom at two points at opposite sides of the back seam.

Referring to Figs. 3 and 4, the illustrated machine is provided with two tack driving assemblies arranged at opposite sides of the machine head and so positioned relatively to the supported upper that their nozzles 386 (Fig. 4) are arranged to engage the lasting margin of the upper at opposite sides of the back seam during movement of the tackers from a position rearwardly of the heel end of the upper forwardly into tack driving position. Each tack driving assembly comprises a driver bar 388 mounted for sliding movement in a guide 390 of usual construction. Tacks are delivered to the nozzles 386 from a hopper 392 through flexible tubes 394, the lower ends of which communicate with tack-receiving openings in offset portions 396 of the guides 390. Each tack driver guide is mounted in a carrier 398 secured to a slide 400 (Fig. 3) mounted for horizontal movement in a guideway 402 provided in a bracket 404 secured to the plate 34. It will be understood that there are two such mechanisms, one on each plate 34. To afford adjustment of the tack-receiving nozzles 396 widthwise of the shoe, the tack driver guide 390 is mounted to swing on a headed pin 406 in the carrier 398 and is secured in adjusted position by a set screw 408 in the lower portion of the carrier. To afford adjustment of the nozzles 386 heightwise of the upper, the bracket 404 is vertically adjustable on the plate 34 being secured thereto by clamping screws 410 (Fig. 3) extending through vertical slots in said bracket. The guideways 402 which control the advancement of the tack nozzles 386 to wipe the lasting margin of the upper over the flange of the counter are arranged to converge forwardly in order to cause the nozzles to move inwardly over the flange of the counter in paths converging toward the longitudinal median line of the rear part of the last, said paths being substantially perpendicular to those portions of the edge of the last. Referring to Figs. 2 and 5, the tackers are moved forwardly to cause the nozzles 386 to overwipe the lasting margin of the upper by power-operated mechanism comprising a driven gear 412 secured to the camshaft 182 and arranged to mesh with a gear 414 on a shaft 416 which has secured to its forward end a bevel gear 418 which meshes with a bevel gear 420 on a cross shaft 422. Secured to the cross shaft are arms 424 carrying at their free ends rolls 426 constructed and arranged to engage the rear end portions of slides 428 mounted in guideways in brackets 430. Said slides have outwardly extending lugs 432 which are pivotally connected to blocks 434 mounted on links 436 and adjustable longitudinally thereon. At their forward ends, the links 436 are pivoted to short levers 438 secured to vertical shafts 440. At their upper ends said shafts carry levers 442 (Figs. 3 and 4) which are connected by links 444 to the slides 400. The levers 442 are secured to the shaft 440 by split clamps 446 which enable the operator to adjust said levers vertically on the shaft 440 when adjusting the brackets 404. The tackers are withdrawn to their rest positions after the tacks are driven by the operation of springs 448 (Fig. 5) extending from the levers 438 to the rear legs of the machine, the operation of said springs occurring during the rearward movement of the arms 424. The tack driver bars 388 are actuated to drive tacks through the margins of the upper, counter, lining, and insole by the expansion of a spring 450 (Fig. 3) surrounding a vertical shaft 452 at the rear of the machine. Mounted on the lower portion of said shaft is a crosshead 454 and pivoted to opposite ends of the crosshead are links 456 extending upwardly and outwardly and pivoted at their upper ends to outwardly extending levers 458 secured to the rear portions of shafts 460 journaled in a superstructure 462. At their forward ends, the shafts 460 have secured thereto outwardly and downwardly extending arms 464 each of which has at its free end a universal connection to a link 466 which is connected by a ball-and-socket joint to the upper portion of the tack driver bar 388. For energizing the spring 450 and timing the actuation of the tack driver bars, a cam 468 (Fig. 25) is secured to the camshaft 182 and arranged to engage a roll 470 at the lower end of the shaft 452.

The operations on the shoe having now been completed, the grippers 44, 46 and the wipers 130 and 132 are disengaged from the upper by the operation of an arm 472 (Fig. 2) secured to the cross shaft 422 and having at its free end a roll 474 constructed and arranged to engage the bell crank lever 98 and swing said lever in a counterclockwise direction, as seen in Fig. 2, to return it to its latched position therein illustrated, thereby operating the lever 102 (Fig. 1) to return the grippers and the wipers to their open position therein illustrated. It will be understood that the operation of the lever 102 will also serve to move the grippers downwardly into their position, illustrated in Fig. 24, to facilitate the removal of the shoe from the machine. In order that the downward movement of the grippers will not commence until after the grippers have opened, the disk 228 is so arranged that its inturned flange underlies the pawl 216, as shown in Fig. 23, during the first part of the movement of the lever 102. After the lever 102 has opened the gripper jaws, the pawl 216 moves off the inturned flange of the disk 228 and engages one of the ratchet teeth 222 and swings the arm 86 downwardly, thus drawing the grippers down into their position illustrated in Fig. 24. During the latter part of the machine cycle, the counter carrier moves upwardly into its rest position, illustrated in Fig. 1. During the latter part of this upward movement, an abutment member or yoke 488 on the member 260 engages the front faces of the plates 34 causing said member 260 to swing in a clockwise direction about its fulcrum 262 on the lever 264 until such swinging movement is arrested by the engagement of a stop screw 490 in the yoke 488 with the lever 264. The operator may adjust the stop screw 490 to cause the counter carrier to come to rest in the position which he finds most convenient for the positioning of counters on said carrier.

The tack pot and tack separating and delivering mechanism may be similar to that illustrated in United States Letters Patent No. 1,671,430 granted May 29, 1928 on application of Norwood H. Knowlton. The tack pot 392 is operated by a sprocket 476 (Fig. 5) mounted on the hub of the bevel gear 420 and meshing with a chain 478 (Fig. 2) extending upwardly to a sprocket (not shown) on the shaft of the tack pot 392.

In the operation of the machine, a lined upper such, for example, as the upper 42 illustrated in Fig. 1, is arranged in inverted position and its back-seam portion is moved upwardly into the space 480 between the arm 134 and the adjacent portion of the carrier 40 to bring the top marginal portion of the upper into position to be received between the gripper jaws 44, 46. The upper is then moved downwardly until it comes to rest on the fin 48 on the inner gripper jaw 44. While the grippers 44, 46 and the wipers 130 and 132 are still in their open position, the operator makes such widthwise adjustment of the upper as may be required to center the back seam relatively to the grippers and the wipers. To enable the operator to see the inner portion of the back seam and position it correctly relatively to the wipers, the arm 134 and the lining deflector 250 are provided respectively with vertical slots 482 and 484 (Fig. 17).

Before starting the machine, the operator also positions a molded counter, for example, the counter 486, illustrated in Figs. 1 and 9, in the counter carrier, the counter-locating member 256 acting to center the rear portion of the counter relatively to the carrier by its engagement within a notch cut in the flange of the counter. The operator now actuates the knee lever 114 to close the grippers and the back seam wipers on the upper and then the operation of said lever is arrested while the rear part of the lining 312 is drawn downwardly out of the upper. Thereupon, the operation of the knee lever is completed to start the power cycle of the machine. During the first part of the power cycle, the back seam wipers move upwardly to upwipe and straighten the back-seam portion of the upper and then to impart heightwise tension thereto and, at the same time, the counter holder moves downwardly to insert the counter into the heel end of the upper. Upon the completion of movement of the counter into the upper, the lining wipers 314 enter the upper and move upwardly therein to wipe the lining against the inner surface of the counter while the operator maintains a light forward tension on the lining to obviate the occurrence of wrinkles therein. The lining wipers, due to their inclination to the longitudinal axis of the upper, act first to wipe the extremity of the heel portion of the lining against the inner surface of the back-seam portion of the upper and thereafter wipe the side portions of the lining upwardly and toewardly until the lining wipers finally come into parallel relation to the flange of the counter at the limit of their wiping movement and press the margin of the lining firmly against said flange. After the lining wipers complete their upwiping movement, they immediately return to their rest position, illustrated in Fig. 1, and the machine stops. During the interval between the two parts of the power cycle of the machine, the last 382 (Fig. 22) is inserted into the upper through its bottom opening and the knee lever is operated to start the last part of the power cycle. The lining wipers now move upwardly into engagement with the cone of the last to force the last upwardly and rearwardly into the upper and, at the same time, the counter carrier moves forwardly disengaging itself from the counter and then moves upwardly to its rest position. The last is positioned lengthwise of the upper by its engagement with the inner gripper jaw 44 and the heel end of the lining and is positioned heightwise of the upper by its engagement with the then bottom face of the lining deflector 250, or in the absence of the lining deflector, with the flat bottom face of the wiper 130. As the lining wiper assembly comes into position to support the last 382, the tacker nozzles 386 engage the lasting margin of the upper and perform their overwiping operation. While the lining wiper assembly continues to support the last, the tack drivers operate to drive two tacks through the margins of the upper, counter, lining and insole, said tacks being clenched against the heel plate on the last bottom. After the tacks are driven, the tack drivers are immediately withdrawn to their rest positions. At the same time, the lining wipers move downwardly away from the last, and the gripper jaws 44, 46 and wipers 130, 132 are opened. Immediately upon opening the gripper jaws, they are moved downwardly away from the upper, whereupon the latch 94 (Fig. 6) engages the bell crank lever 98 to hold the grippers in this position. The shoe is then removed from the machine and the finger lever 214 (Fig. 24) is operated to release the latch 208 and permit the grippers and the back seam wipers to return to their respective rest positions, illustrated in Fig. 1. The machine is now ready to receive another upper to be operated upon.

While the operation of the machine has been herein described in connection with the assembling of a molded counter in an upper having a full quarter lining, it is to be understood that the machine may be arranged to insert a counter into an upper having only a counter pocket for a lining by merely removing the lining deflector 250. It will also be understood that the illustrated machine is well adapted to insert counters into back parts or quarters which have not been stitched to their vamps. In this case, the lasting margin of the upper probably would not be tacked to an insole although in some types of work it might be found advisable to tack the lasting margin of the upper to a heel piece attached to the bottom of a last or other suitable form.

Having thus described my invention, what I claim as new and desire to secure by Letters Patent of the United States is:

1. In a machine for assembling uppers and counters, means for supporting an upper in a predetermined heightwise position and a counter carrier operable to advance the counter from a loading station in which the counter extends forwardly from the carrier through a path confined to a plane common to the longitudinal median line of the supported upper and into predetermined heightwise relation to the upper.

2. In a machine for assembling uppers and counters, means for supporting the rear part of an upper in predetermined heightwise position comprising grippers constructed and arranged to engage the upper at opposite ends of the back seam, said grippers being operable to impart heightwise tension to the upper, a counter carrier having a loading station in which the counter is positioned in heightwise alinement with the upper, and means for advancing the carrier to position the counter in the upper.

3. In a machine for assembling uppers and counters, means for supporting an upper, a counter carrier, a member on which said carrier is mounted for movement heightwise of the upper, and a fixture on which said member is mounted for movement heightwise of the upper.

4. In a machine for assembling uppers and counters, means for supporting an upper, a counter carrier, a plate on which said carrier is mounted and on which the carrier is adjustable heightwise of the counter, a member on which said plate is mounted for swinging movements generally heightwise of the upper, and a fixture on which said member is mounted for swinging movement into a predetermined position heightwise of the upper.

5. In a machine for assembling uppers and counters, means for supporting an upper, means for positioning a counter in the upper comprising a member mounted for movement heightwise of the upper into a predetermined position, and a counter carrier mounted on said member for swinging movement into a position determined by the engagement of the counter with the heel end of the upper.

6. In a machine for assembling uppers, a counter carrier, a member on which said carrier is mounted for swinging movement in a plane common to the longitudinal median line of the upper, and a fixture on which said member is mounted for swinging movement in said plane.

7. In a machine for assembling uppers and counters, means for supporting an upper, a counter carrier, a member on which said carrier is mounted for swinging movement in a plane common to the longitudinal median line of the upper, a fixture on which said member is mounted for swinging movement in said plane, and yielding means for swinging the carrier on said member upon initiation of the swinging movement of said member.

8. In a machine for assembling uppers and counters, means for supporting an upper, a counter carrier, a member on which said carrier is mounted for swinging movement in a plane common to the longitudinal median line of the upper, a fixture on which said member is mounted for swinging movement in said plane, yielding means for swinging the carrier on said member upon initiation of the swinging movement of said member, and means for adjustably determining the initial angular relation of the counter carrier to said member.

9. In a machine for assembling uppers and counters, means for supporting an upper, a counter carrier, a member on which said carrier is mounted for movement heightwise of the upper, a fixture on which said member is mounted for movement heightwise of the upper, and a stop for arresting the movement of the carrier relatively to the member.

10. In a machine for assembling uppers and counters, means for supporting an upper, a counter carrier, a member on which said carrier is mounted for movement generally heightwise of the upper, a fixture on which said member is mounted for movement heightwise of the upper, yielding means for moving the carrier relatively to said member, and means operating positively on the carrier after the counter has entered the upper to further move the counter carrier relatively to said member to bring the counter into predetermined relation to the upper.

11. In a machine for assembling uppers and counters, means for supporting an upper, a counter carrier, an operating member on which said carrier is mounted to swing in a plane extending heightwise of the upper, a fixture on which said operating member is mounted for swinging movement in said plane, yielding means for swinging the counter carrier relatively to said operating member, and means operating positively on the counter carrier after the counter has entered the upper to move the counter toward the heel end of the upper and into predetermined relation to the upper lengthwise thereof.

12. In a machine for assembling uppers and counters, means for supporting an upper, a counter carrier, an operating member on which said carrier is mounted for swinging movement in a plane extending heightwise of the upper, said operating member being mounted for swinging movement in said plane, and a fixed member constructed and arranged to be engaged by the counter carrier after the counter has entered the upper and to cause said counter carrier to be swung positively relatively to said operating member to force the counter into the heel end of the upper.

13. In a machine for assembling uppers and counters, the combination with counter locating means of a counter carrier comprising counter holders constructed and arranged to receive the bottom margin of a counter and separated from each other to provide clearance for said counter locating means.

14. In a machine for assembling uppers and counters, a counter locator operable by interengagement of complementally shaped portions of the counter locator and a counter, and a counter carrier comprising counter holders constructed and arranged to receive the bottom margin of the counter and spaced from each other to admit the counter locator between them.

15. In a machine for assembling uppers and counters, means for supporting an upper including a gripper member constructed and arranged to engage the inner surface of the lasting margin at the region of the back seam, and a counter carrier comprising counter holders constructed and arranged to receive the bottom margin of a counter and separated from each other to permit said gripper member to be located between them.

16. In a machine for assembling uppers and counters, a counter carrier comprising means constructed and arranged to receive the bottom margin of a counter, and members constructed and arranged to engage the outer surface of the counter wings.

17. In a machine for assembling uppers and counters, a counter carrier comprising means constructed and arranged to receive the bottom margin of a counter, members constructed and arranged to engage the outer surface of the counter wings thereby to space the wings from each other and to prevent the wings from spreading during the assembling operation, and means for adjusting said wing-engaging members toward and from each other.

18. In a machine for assembling uppers and counters, a counter carrier including members constructed and arranged to engage the wing portions of the counters, said members being adjustable generally heightwise of a counter in the carrier.

19. In a machine for assembling uppers and counters, a counter carrier including fingers constructed and arranged to engage the wing portions of a counter in the carrier, members on which said fingers are mounted for adjustment generally heightwise of the counter, and means for adjusting said members toward and from each other.

20. In a machine for assembling uppers and counters, a counter carrier comprising means constructed and arranged to receive the bottom margin of a counter, a pair of fingers constructed and arranged to engage opposite wings of the counter, members on which said fingers are mounted for adjustment generally heightwise of the counter, and means for adjusting said members toward and from each other.

21. In a machine for assembling uppers and counters, a counter carrier comprising means recessed to receive the bottom margin of a counter, members constructed and arranged to engage the wings of the counter, slides on which said members are mounted for adjustment generally heightwise of the counter, and means for moving the slides to adjust said members widthwise of the counter.

22. In a machine for assembling uppers and counters, a counter carrier comprising means constructed and arranged to receive the bottom margin of the counter, and members constructed and arranged to engage the outer surface of the counter wings thereby to space the wings from each other and to prevent the wings from spreading during the assembling operation, said counter holding means being adjustable heightwise of the counter.

23. In a machine for assembling uppers and counters, means for supporting an upper in a predetermined heightwise position, a member constructed and arranged to engage the bottom margin of a counter to orient the counter, and a counter carrier including holders constructed and arranged to receive the bottom margin of the counter, said holders being spaced apart from each other to permit said counter locating member to be positioned between them.

24. In a machine for assembling uppers and counters, means for supporting an upper comprising bottom margin engaging members and top margin grippers constructed and arranged to engage the back-seam portion of the upper, one of said top margin grippers being characterized by a fin for supporting an inverted upper by its top edge while the other top margin gripper is provided with a recess within which said fin is received.

25. In a machine for assembling uppers and counters, means for supporting an upper comprising top margin grippers and bottom margin grippers constructed and arranged to engage the back-seam portion of the upper and a member on which said top margin grippers are mounted for adjustive movement heightwise of the upper, and means for indicating the adjustive position of said top margin grippers.

26. In a shoe machine, means for shaping the heel portion of a shoe upper off the last comprising wipers constructed and arranged to engage the inner and outer surfaces of the upper respectively and to wipe the upper heightwise.

27. In a shoe machine, means for shaping an end portion of a shoe upper off the last comprising wipers constructed and arranged to engage the inner and outer surfaces of the upper respectively and to wipe the upper heightwise, said wipers being constructed and arranged to form a heightwise curvature in the upper at their point of operation thereon.

28. In a shoe machine, means for shaping an end portion of a shoe upper off the last comprising wipers constructed and arranged to engage the inner and outer surfaces of the upper respectively and to wipe the upper heightwise, said wipers having complementally curved wiping surfaces for forming a local heightwise curvature in the upper at their point of operation thereon.

29. In a shoe machine, gripping means constructed and arranged to engage the top margin at the extremity of the heel end of a shoe upper off the last and upper-shaping members constructed and arranged to engage the inner and outer surfaces of the upper respectively and operable by relative heightwise movement of said members and the upper.

30. In a shoe machine, means for shaping the extremity of the heel end of a shoe upper off the last comprising wiper members constructed and arranged to engage the inner and outer surfaces of the upper respectively and operable by relative heightwise movement of the upper and said members.

31. In a shoe machine, means for shaping the extremity of the heel end of a shoe upper off the last comprising an inner wiper member and an outer wiper member constructed and arranged to engage the back-seam portion of the upper between them, said inner wiper member being constructed and arranged to serve as a locator for positioning the heel end of a last heightwise relatively to the upper.

32. In a shoe machine, means for operating on the extremity of the heel end of a shoe upper comprising a wiper member constructed and arranged to enter the groove at the back-seam portion of the upper and operable by relative movement of the upper and said member heightwise of the upper.

33. In a shoe machine, a pair of grippers constructed and arranged to engage a marginal portion at the extremity of the heel end of a shoe upper off the last and a pair of upper-shaping members constructed and arranged to engage the inner and outer surfaces of the upper respectively and operable by relative heightwise movement of said members and the upper, means for effecting wiping engagement of said members with the upper during a part of such heightwise movement, and means for effecting gripping engagement of said members with the upper during another part of such heightwise movement.

34. In a shoe machine, means for shaping an end portion of a shoe upper off the last comprising members constructed and arranged to engage the upper between them and wipe the upper heightwise then to grip the upper between them and apply heightwise tension thereto.

35. In a shoe machine, means for gripping an end portion of a shoe upper off the last by a marginal portion thereof, and means for shaping said end portion comprising members constructed and arranged to engage the upper between them and to wipe the upper heightwise from a point adjacent to said grippers then to exert a gripping action against the upper while continuing their movement away from said gripper to apply heightwise tension to the upper.

36. In a shoe machine, means for gripping an end portion of a shoe upper, and upper-shaping means comprising wipers movable heightwise of the upper away from said gripping means, one of said wipers having means constructed and arranged to operate within the groove at the back-seam portion of the upper to exert a straightening action on the upper.

37. In a shoe machine, means for shaping an end portion of a shoe upper off the last comprising wipers constructed and arranged to engage the upper between them and to wipe the upper heightwise, means for closing the wipers on the upper preparatory to the wiping operation, means for actuating the wipers, and means operating automatically during the latter part of the actuation of the wipers to bring them into gripping engagement with the upper in order that continued movement of the wipers will impart heightwise tension to the upper.

38. In a shoe machine, grippers constructed and arranged to engage the top margin at the back-seam portion of the upper, wiper members constructed and arranged to engage the inner and outer surfaces of the upper respectively, means for closing said grippers on the upper, means for bringing said wiper members into wiping engagement with the upper, means for actuating said wiper members to wipe the upper heightwise from a point adjacent to the top margin, and means operating automatically during such heightwise movement of the wipers to bring the wipers into gripping engagement with the upper in order that continued heightwise movement of the wipers will cause the wipers to tension the upper against said grippers.

39. In a machine for shaping the rear parts of shoe uppers off the last, means for upwiping the back-seam portion of the upper including a wiper member constructed and arranged to engage the back-seam substance of the upper thereby to center the back seam relatively to the wiper member during the wiping operation.

40. In a machine for shaping the rear parts of shoe uppers off the last, means for upwiping the back-seam portion of the upper including a wiper member constructed and arranged to engage the outer surface of the upper, said wiper member having a tongue constructed and arranged to act in the groove at the back seam.

41. In a machine for shaping the rear parts of shoe uppers off the last, means for wiping the back-seam portion heightwise of the upper including wiping means constructed and arranged to engage the rib formed by the inseam substance in the interior of the shoe and to position said rib relatively to the wiping means during the wiping operation.

42. In a machine for shaping the rear parts of shoe uppers off the last, means for wiping the back-seam portion heightwise of the upper including a wiper member positioned to engage the inner surface of the upper and constructed and arranged to engage opposite sides of the rib formed by the inseam substance in the interior of the shoe.

43. In a machine for shaping the rear parts of shoe uppers off the last, means for wiping the rear part heightwise of the upper comprising a wiper member constructed and arranged to engage the outer surface of the upper and a wiper member position to engage the inner surface of the upper and constructed and arranged to engage opposite side walls of a rib formed by the inturned margins of the back-seam substance.

44. In a machine for shaping the rear parts of shoe uppers off the last, means for wiping the back-seam portion of the upper heightwise including a wiper member positioned to engage the inner surface of the upper, said wiper member being recessed to receive the rib formed by the inturned margins of the back-seam portion of the upper, the walls of said recess being spaced from each other to an extent substantially equal to the thickness of said rib.

45. In a shoe machine a pair of grippers constructed and arranged to engage the top margin at the extremity of the heel end of a shoe upper and a wiper member constructed and arranged to enter the groove at the back-seam portion of the upper and operable by relative movement of the upper and said member heightwise of the upper to wipe the upper from a point adjacent to said grippers toward the lasting margin of the upper.

46. In a machine for assembling uppers and counters, means for supporting a lined upper in a predetermined heightwise position, and a lining deflector operable upon introduction of an upper into the machine to separate the lining from the upper.

47. In a machine for assembling uppers and counters, means for supporting a lined upper, and a lining deflector for separating the lining from the upper, said deflector being movable out of the upper to permit the insertion of a counter.

48. In a machine for assembling uppers and counters, means for supporting a lined upper in a predetermined heightwise position including wipers constructed and arranged to engage the back-seam portion of the upper, and means for separating the lining from the upper comprising a lining deflector mounted on the inner wiper member.

49. In a machine for assembling uppers and counters, means for supporting a lined upper in a predetermined heightwise position, and a removable lining deflector operable upon introduction of an upper into the machine to separate the lining from the upper.

50. In a machine for assembling uppers and counters, means for supporting a lined upper in predetermined heightwise position, a lining deflector operable upon introduction of an upper into the machine to separate the lining from the upper, and means for moving the lining deflector into a position in which it serves as a locator for positioning the heel end of a last heightwise relatively to the upper.

51. In a machine for shaping the rear parts of lined uppers off the last, means for supporting the rear part of an upper by its top margin, means for inserting a counter into the upper, and means for wiping the lining at the rear part of the upper heightwise of the upper toward its lasting margin.

52. In a machine for shaping the rear parts of lined uppers off the last, means for supporting the rear part of the upper, means for inserting a counter into the upper, and lining wiping means constructed and arranged to engage opposite side portions and the end portion at the rear part of the upper and to wipe the lining heightwise of the upper toward its lasting margin.

53. In a machine for shaping the rear parts of lined uppers off the last, means for supporting the rear part of an upper, means for inserting a counter into the upper, and means for wiping the rear part of the lining heightwise toward the lasting margin of the upper, said wiping means comprising a pair of plates shaped for uniform engagement with the lining and hinged together for expanding and contracting movement during the wiping operation.

54. In a machine for shaping the rear parts of lined uppers off the last, means for supporting the rear part of an upper by its top margin, wipers for wiping the lining at the rear part of the upper heightwise of the upper toward its lasting margin, and a carrier on which the wipers are mounted at an angle to the longitudinal axis of the upper such that the wipers act on the extremity of the rear part of the lining before acting on the adjacent side portions of the lining.

55. In a machine for shaping the rear parts of lined uppers off the last, means for supporting the rear part of an upper and means for wiping the rear part of the lining heightwise toward the lasting margin of the upper, said wiping means comprising a pair of plates hinged together for expanding and contracting movement during the wiping operation, a carrier for the plates, and a member on which the carrier is mounted at an angle to the longitudinal axis of the upper such that the plates act on the extremity of the rear part of the lining before acting on the adjacent side portions of the lining.

56. In a machine for shaping the rear parts of lined uppers off the last, means for supporting the rear part of an upper and means for wiping the rear part of the lining heightwise toward the lasting margin of the upper, said wiping means comprising a pair of plates hinged together for expanding and contracting movement during the wiping operation, a carrier for the plates, a member on which the carrier is mounted at an angle to the longitudinal axis of the upper such that the plates act on the extremity of the rear part of the lining before acting on the adjacent side portions of the lining, said carrier being mounted on said member for swinging movement about an axis extending widthwise of the upper to bring the wipers into parallel relation to the flange of a molded counter mounted in the upper.

57. In a machine for shaping the rear parts of lined uppers off the last, means for supporting the rear part of an upper and means for wiping the rear part of the lining heightwise toward the lasting margin of the upper, said wiping means comprising wiper plates, a carrier for said plates, a member on which the carrier is mounted at an angle to the longitudinal axis of the upper such that the wiper plates act on the extremity of the rear part of the lining before acting on the adjacent side portions of the lining, and means for actuating said member first to move said carrier bodily heightwise of the upper to upwipe the extremity of the rear part of the lining and then to swing said carrier heightwise and toewardly of the upper to impart a combined forward and upward wipe to said adjacent side portions of the lining.

58. In a machine for shaping the rear parts of lined uppers off the last, means for supporting the rear part of the upper, means for wiping the rear part of the lining heightwise toward the lasting margin of the upper, said wiping means comprising hinged plates shaped for uniform engagement with the lining and hinged together for expanding and contracting movement during the wiping operation, and a carrier on which said plates are mounted to turn as a unit for orientation relatively to the rear part of the upper.

59. In a machine for shaping the rear parts of lined uppers off the last, means for supporting the rear part of the upper, means for wiping the rear part of the lining heightwise toward the lasting margin of the upper, said wiping means comprising hinged plates shaped for uniform engagement with the lining and hinged together for expanding and contracting movement during the wiping operation, a carrier on which said plates are mounted to turn as a unit for orientation relatively to the rear part of the upper, and yielding means for maintaining a predetermined orientation of said plates relatively to the carrier.

60. In a machine for shaping the rear parts of lined uppers off the last, means for wiping the rear part of the lining against the inner surface of an inwardly flanged counter comprising wiper members movable heightwise of the upper toward the flange of the counter and movable about an axis extending widthwise of the upper to bring them into parallel relation to said flange.

61. In a machine for shaping the rear parts of lined uppers off the last, means for wiping the rear part of the lining against an inwardly flanged counter comprising wiper members and a carrier on which said members are mounted for movement heightwise of the upper toward the counter flange and for swinging movement into parallel relation to the flange of the counter.

62. In a machine for shaping the rear parts of lined uppers off the last, means for wiping the rear part of the lining heightwise of the upper comprising a pair of wiper plates the wiping edges of which are shaped to conform generally to the curvature of the interior of the rear part of a liner upper, said wipers being pivoted together for expanding and contracting movement, yielding means for holding said wipers contracted, and means operable during the actuation of the wipers for expanding them thereby to maintain contact of the wipers with the lining.

63. In a machine for shaping the rear parts of lined uppers off the last, a pair of wipers for wiping the rear part of the lining heightwise of the upper, a carrier for the wipers, and means on the carrier for expanding the wipers during their wiping movement to maintain contact of the wipers with the lining.

64. In a machine for shaping the rear parts of lined uppers off the last, a pair of lining wipers hinged together for expanding and contracting movement, a carrier on which the wipers are loosely mounted, and means on the carrier constructed and arranged to expand the wipers during their wiping movement.

65. In a machine for shaping the rear parts of lined uppers off the last, a pair of wipers for wiping the rear part of the lining heightwise of the upper, said wipers being hinged together for expanding and contracting movement, yielding means for contacting the wipers, a carrier on which the wipers are loosely mounted, and wedge shaped means on the carrier constructed and arranged to engage the wipers and to expand them into lining wiping position.

66. In a machine for shaping the rear parts of lined uppers off the last, a pair of hinged wipers for wiping the rear part of the lining heightwise of the upper, a carrier on which the wipers are loosely mounted, a wedge-shaped member on the carrier constructed and arranged to expand the wipers, said wedge-shaped member having arcuate surfaces constructed and arranged to engage complemental arcuate surfaces on the wipers, said arcuate surfaces permitting the wipers to turn as a unit on the carrier for orientation to the upper.

67. In a machine for shaping the rear part of lined uppers off the last, a pair of hinged wipers for wiping the rear part of the lining heightwise of the upper, a carrier on which the wipers are loosely mounted, a wedge shaped member on the carrier operable by relative movement of the carrier and the wipers toward the hinge of the wipers to expand the wipers, and complemental arcuate surfaces on the wipers and said wedge-shaped member constructed and arranged to permit bodily turning movement of the wipers from a normal rest position, and yielding means on the wipers for holding the wipers retracted and in said normal rest position.

68. In a machine for shaping the rear part of lined uppers off the last, a pair of hinged wipers for wiping the rear part of the lining heightwise of the upper, a carrier on which the wipers are loosely mounted, a wedge shaped member on a carrier operable by relative movement of the carrier and the wipers toward the hinge of the wipers to expand the wipers, and complemental arcuate surfaces on the wipers and said wedge-shaped members constructed and arranged to permit bodily turning movement of the wipers from a normal rest position, yielding means on the wipers for holding the wipers retracted and in said normal rest position, and an actuator on which said carrier is mounted for swinging movement about an axis extending widthwise of the upper.

69. In a machine for shaping the rear parts of lined uppers, means for supporting the rear part of a lined upper off the last, and means operable to wipe the rear part of the lining heightwise of the upper and operable thereafter to force a last into the rear part of the upper.

70. In a machine for shaping the rear parts of lined uppers, means for supporting the rear part of a lined upper off the last, and a member operable to wipe the rear part of the lining heightwise of the upper and operable thereafter to force a last into the rear part of the upper and to support the rear part of the last while the upper is fastened to an insole or heel piece on the last bottom.

71. In a machine for shaping the rear parts of lined uppers, means for supporting the rear part of a lined upper off the last, a pair of wipers for wiping the rear part of the lining heightwise of the upper, and means for actuating said wipers first to cause them to perform their wiping function on the lining, then to retract them from the upper to permit the insertion of a last into the upper and finally to cause them to force the rear part of the last into position in the rear part of the upper.

72. In a machine for shaping the rear parts of lined uppers, means for supporting the rear part of a lined upper off the last, a pair of wipers for wiping the rear part of the lining heightwise of the upper, and means for actuating said wipers first to cause them to perform their wiping function on the lining, then to retract them from the upper to permit the insertion of a last into the upper and finally to cause them to force the rear part of the last into position in the rear part of the upper and to support the last in said position while the lasting margin of the heel portion of the upper is wiped over an insole or a heel piece on the last bottom and fastened thereto.

73. In a machine for shaping the rear parts of lined uppers, means for supporting the rear part of a lined upper off the last, means operable first to wipe the rear part of the lining heightwise of the upper, then to force the rear part of a last into position in the rear part of the upper, and finally to support the last in said position, and fastening-inserting means operable to wipe the lasting margin at the rear part of the upper inwardly over an insole or a heel piece on the last bottom and to fasten the overwiped margin thereto.

74. In a machine for operating on the rear parts of lined uppers off the last, means for wiping the lining at the rear part of the upper heightwise of the upper, and means for preventing contact of said wiping means with the lining during a portion of its operating movement.

75. In a machine for operating on the rear parts of lined uppers off the last, means for wiping the lining at the rear part of the upper heightwise of the upper, means for preventing contact of said wiping means with the lining during a portion of its operating movement, and means for preventing contact of the wiping means with the lining during its retracting movement.

76. In a machine for operating on the rear parts of lined uppers off the last, means for wiping the lining at the rear part of the upper heightwise of the upper, grippers for holding the upper by its top margin during the lining wiping operation, a carrier for the grippers, said carrier being adjustable heightwise of the upper, and means on said carrier for preventing contact of said wiping means with the lining during a portion of its operating movement.

77. In a machine for operating on the rear parts of lined uppers off the last, lining wipers, a wiper carrier, an operating member for moving the carrier heightwise of the upper, grippers for holding the upper by its top margin during the operation of the lining wipers, a carrier for the grippers movable to adjust the grippers heightwise of the upper, a roll on said gripper carrier, and a cam on said wiper operating member constructed and arranged to act against said roll thereby to prevent contact of the lining wipers with the lining during a portion of their operating movement.

78. In a machine for operating on the rear parts of lined uppers off the last, a pair of lining wipers constructed and arranged to wipe the lining at the rear part of the upper heightwise of the upper, a carrier on which the wipers are mounted for such heightwise movement, a cam mechanism for moving the carrier toewardly of the upper to prevent contact of the wipers with the lining during part of their operating movement, and cam mechanism operative only during the retraction of the wipers to move the carrier toewardly to prevent contact of the wipers with the lining.

79. In a machine for assembling lined uppers and counters, means for stretching the back-seam portion of an upper and holding it in stretched condition for the reception of a counter, means for inserting a counter into the upper, and wipers for wiping the lining at the heel portion of the upper heightwise of the upper toward its lasting margin.

80. In a machine for assembling lined uppers and counters, means for supporting an upper by its heel portions, means for inserting a counter into a predetermined position in the upper, and wipers for wiping the lining at the heel portion of the upper heightwise of the upper toward its lasting margin.

81. In a machine for assembling lined uppers and counters, means for holding an upper by opposite ends of its back-seam portion for the reception of the counter, means for inserting a counter into the upper, means for wiping the lining at the heel portion of the upper heightwise of the upper toward its bottom margin, fastening inserting means for securing the bottom margins of the upper and counter comprising fastening drivers and members through which fastenings are driven, means for moving said members into predetermined relation to the bottom margin of the upper, and means for actuating said drivers.

82. In a machine for operating on the rear parts of shoe uppers, means for gripping the top marginal portion of an upper in the region of the back seam, means for forcing the rear part of a last into the rear part of the upper held by said grippers, means for fastening the upper to the last, and automatic means for withdrawing the gripping means into a remote position to facilitate the removal of the last and upper from the machine.

83. In a machine for operating on shoe uppers, upper gripping means, mechanism for withdrawing the gripping means into a position remote from the upper, and means for rendering said mechanism inoperative.

84. In a machine for operating on shoe uppers, upper gripping means, mechanism including a pawl and ratchet for withdrawing said gripping means into a position remote from the upper, and means for preventing contact of the pawl with the ratchet thereby to render said mechanism inoperative.

85. In a machine for operating on the rear parts of shoe uppers, grippers constructed and arranged to engage the top marginal portion of an upper in the region of the back seam, means for fastening the upper to an insole on a last bottom, and means for withdrawing the grippers away from the upper in a path tangent to the curve of the back seam to facilitate the removal of the last and upper from the machine.

86. In a machine for operating on shoe uppers, grippers constructed and arranged to engage the top marginal portion of an upper in the region of the back seam, a carrier on which the grippers are mounted for movement away from the upper in a path tangent to the curve of the back seam, and mechanism for actuating the carrier to move the grippers away from the upper.

87. In a machine for operating on shoe uppers, upper gripping means, yielding means for holding said gripping means in operative position, mechanism including a pawl and ratchet for moving said gripping means into a position remote from the upper, and automatic mechanism for disengaging the pawl from the ratchet to permit the return of the gripping means to its initial position.

88. In a machine for operating on shoe uppers, a pair of upper engaging grippers, yielding means for closing the grippers on the upper, yielding means for holding the grippers in position to engage the upper, an operating member for opening said grippers, and mechanism for moving said grippers into a position remote from the upper including a ratchet and a pawl constructed and arranged to be actuated by said operating member.

89. In a machine for operating on shoe uppers, a pair of upper engaging grippers, yielding means for closing the grippers on the upper, yielding means for holding the grippers in position to engage the upper, an operating member for opening said grippers, mechanism for moving said grippers into a position remote from the upper including a ratchet and a pawl constructed and arranged to be actuated by said operating member, and means for rendering said pawl inoperative thereby to enable said operating member to open the grippers without moving the grippers from their operative position.

90. In a machine for operating on the rear parts of shoe uppers, a pair of grippers constructed and arranged to engage the top marginal portion of an upper in the region of the back seam, wipers for wiping the back seam portion of the upper from a point adjacent to said grippers toward the lasting margin, an operating member for opening the grippers, mechanism actuated by said operating member to move said gripper members into a position remote from the upper, and means operating upon return of the wipers to their initial position for rendering said mechanism inoperative to retain said grippers in said remote position.

91. In a machine for operating on the rear parts of shoe uppers, a pair of grippers constructed and arranged to engage the top marginal portion of an upper in the region of the back seam, yielding means for holding said grippers in a predetermined position for operation on the upper, means for wiping the back-seam portion of the upper from a position adjacent to said grippers toward the lasting margin of the upper, means for advancing and retracting said wiping means, means for moving said grippers into a position remote from the upper, and means rendered operative by the retraction of the wiping means for returning said grippers to their operative position.

92. In a shoe machine, a pair of gripper jaws, a member for opening said jaws, a carrier for said jaws, means operated by said member for moving the carrier in a direction to carry the jaws away from the work, and means for timing such movement of the carrier to permit the jaws to open before the carrier moves.

93. In a shoe machine, a pair of gripper jaws, a carrier therefor, an operating member for opening said jaws, and means operated by said member for swinging said carrier in a direction to move the jaws away from the work, and means rendering said operating member inoperative to move the carrier until after the jaws have been opened.

94. In a shoe machine, a pair of work-engaging jaws, a carrier therefor, an operating member for opening said jaws, means operated by said operating member for moving said carrier in a direction to carry said jaws away from the work, said means including a pawl and ratchet mechanism, a shield for rendering said pawl and ratchet mechanism inoperative, and means for moving said shield to and from its operative position.

95. In a shoe machine, a pair of work-engaging jaws, a carrier therefor, an operating member for opening said gripper jaws, means operated by said operating member for moving said carrier in a direction to carry said jaws away from the work, said means including a pawl and ratchet mechanism, a shield for rendering said pawl and ratchet mechanism inoperative, and means for moving said shield to and from its operative position, the operative position of the shield being adjustable to vary the time during which said ratchet and pawl are disengaged.

96. In a power-operated machine for operating on the rear parts of shoe uppers, means for supporting the rear part of an upper comprising members constructed and arranged to grip the top marginal portion of the upper and members constructed and arranged to grip the lasting margin, means for separating said members to permit the rear portion of the upper to be positioned between them, a latch for holding said members separated, and a member manually operable to release said latch and then to start the power cycle of the machine.

97. In a power-operated machine for operating on the rear parts of shoe uppers, a pair of grippers constructed and arranged to engage the top marginal portion of an upper, wipers constructed and arranged to engage the inner and outer surfaces respectively of the upper and to wipe the upper from a point adjacent to said grippers toward the lasting margin, an operating member for opening said grippers and said wipers, a latch for holding said member against return movement after it has opened said grippers and wipers, mechanism actuated by said operating member to move said grippers into a position remote from the upper, and means operating upon retraction of the wipers to their initial position for rendering said mechanism inoperative to retain said grippers in said remote position.

EDWARD QUINN.